United States Patent
Ilyas Kaldas et al.

(10) Patent No.: US 10,649,975 B2
(45) Date of Patent: May 12, 2020

(54) METHODS FOR IDENTIFYING DENIAL CONSTRAINTS

(71) Applicants: Ihab Francis Ilyas Kaldas, Doha (QA); Paolo Papotti, Doha (QA); Xu Chu, Doha (QA)

(72) Inventors: Ihab Francis Ilyas Kaldas, Doha (QA); Paolo Papotti, Doha (QA); Xu Chu, Doha (QA)

(73) Assignee: Qatar Foundation, Doha (QA)

( * ) Notice: Subject to any disclaimer, the term of this patent is extended or adjusted under 35 U.S.C. 154(b) by 805 days.

(21) Appl. No.: 14/894,758

(22) PCT Filed: May 31, 2013

(86) PCT No.: PCT/EP2013/061326
§ 371 (c)(1),
(2) Date: Nov. 30, 2015

(87) PCT Pub. No.: WO2014/191057
PCT Pub. Date: Dec. 4, 2014

(65) Prior Publication Data
US 2016/0103867 A1   Apr. 14, 2016

(51) Int. Cl.
*G06F 16/21* (2019.01)
*G06F 16/23* (2019.01)
*G06F 16/215* (2019.01)

(52) U.S. Cl.
CPC ........ *G06F 16/2365* (2019.01); *G06F 16/215* (2019.01); *G06F 16/217* (2019.01); *G06F 16/2379* (2019.01)

(58) Field of Classification Search
CPC .......... G06F 17/30371; G06F 16/2365; G06F 16/217; G06F 16/2379; G06F 16/215
USPC ......................................... 707/690
See application file for complete search history.

(56) References Cited

U.S. PATENT DOCUMENTS

| | | | | |
|---|---|---|---|---|
| 2009/0006302 | A1* | 1/2009 | Fan | G06F 17/30303 706/48 |
| 2009/0287721 | A1* | 11/2009 | Golab | G06F 17/30604 |
| 2010/0250596 | A1* | 9/2010 | Fan | G06F 17/30303 707/776 |

(Continued)

OTHER PUBLICATIONS

International Search Report and Written Opinion in related PCT/EP2013/061326, filed May 31, 2013.

(Continued)

*Primary Examiner* — Kimberly L Wilson
(74) *Attorney, Agent, or Firm* — Benesch, Friedlander, Coplan & Aronoff LLP

(57) ABSTRACT

Computer implemented methods for identifying denial constraints are provided herein. The denial constraints can be used with a database schema R. A predicate space P can be generated for an instance I in the schema R. An evidence set $Evi_I$ can be generated. The evidence set $Evi_I$ can include sets of satisfied predicates in the predicate space P for each instance I. A minimal set of predicates can be identified for the evidence set $Evi_I$. Valid denial constraints can be identified from the minimal set by inverting the predicates in the minimal set.

14 Claims, 8 Drawing Sheets

| TID | FN | LN | GD | AC | PH | CT | ST | ZIP | MS | CH | SAL | TR | STX | MTX | CTX |
|---|---|---|---|---|---|---|---|---|---|---|---|---|---|---|---|
| t | Mark | Ballin | M | 304 | 232-7667 | Anthony | WV | 25813 | S | Y | 5000 | 3 | 2000 | 0 | 2000 |
| t | Chunho | Black | M | 719 | 154-4816 | Fredrick | CO | 80290 | M | N | 10000 | 4.63 | 0 | 0 | 0 |
| t | Annja | Rebizant | F | 636 | 604-2692 | Cyrene | MO | 647HH | M | N | 40000 | 6 | 0 | 4200 | 0 |
| t | Annie | Puerta | F | 501 | 378-7304 | West Crossett | AR | 72045 | M | N | 85000 | 7.22 | 0 | 40 | 0 |
| t | Anthony | Landram | M | 319 | 150-3642 | Gifford | IA | 52404 | S | Y | 15000 | 2.48 | 40 | 0 | 40 |
| t | Mark | Murro | M | 970 | 190-3324 | Centennial | CO | 81416 | S | Y | 60000 | 4.63 | 0 | 0 | 0 |
| t | Ruby | Billinghurst | F | 501 | 378-2720 | Kremlin | AR | 72045 | M | Y | 70000 | 7 | 0 | 35 | 1000 |
| t | Marcelino | Nuth | F | 605 | 540-4707 | Kyle | MO | 57648 | M | N | 10000 | 0 | 0 | 0 | 0 |

TABLE 1

(56) References Cited

U.S. PATENT DOCUMENTS

2010/0306279 A1* 12/2010 Fan .................. G06F 17/30306
707/803

OTHER PUBLICATIONS

Agrawal, et al., "Mining Association Rules Between Sets of Items in Large Databases," Sigmod Record, ACM, New York, NY, US, vol. 22, No. 2; Jun. 1, 1993; pp. 207-216.
Bohannon, et al., "Conditional Functional Dependencies for Data Cleaning," Data Engineering, 2007, ICDE 2007; IEEE 23rd International Conference on IEEE, PI; Apr. 1, 2007 pp. 746-755.
Fan, et al., "Discovering Conditional Functional Dependencies," IEEE Transactions on Knowledge and Data Engineering, IEEE Service Center, Los Alamitos, CA, US, vol. 23, No. 5; May 1, 2011 pp. 683-698.

* cited by examiner

| TID | FN | LN | GD | AC | PH | CT | ST | ZIP | MS | CH | SAL | TR | STX | MTX | CTX |
|---|---|---|---|---|---|---|---|---|---|---|---|---|---|---|---|
| t | Mark | Ballin | M | 304 | 232-7667 | Anthony | WV | 25813 | S | Y | 5000 | 3 | 2000 | 0 | 2000 |
| t | Chunho | Black | M | 719 | 154-4816 | Fredrick | CO | 80290 | M | N | 10000 | 4.63 | 0 | 0 | 0 |
| t | Annja | Rebizant | F | 636 | 604-2692 | Cyrene | MO | 647HH | M | N | 40000 | 6 | 0 | 4200 | 0 |
| t | Annie | Puerta | F | 501 | 378-7304 | West Crossett | AR | 72045 | M | N | 85000 | 7.22 | 0 | 40 | 0 |
| t | Anthony | Landram | M | 319 | 150-3642 | Gifford | IA | 52404 | S | Y | 15000 | 2.48 | 40 | 0 | 40 |
| t | Mark | Murro | M | 970 | 190-3324 | Centennial | CO | 81416 | S | Y | 60000 | 4.63 | 0 | 0 | 0 |
| t | Ruby | Billinghurst | F | 501 | 378-2720 | Kremlin | AR | 72045 | M | Y | 70000 | 7 | 0 | 35 | 1000 |
| t | Marcelino | Nuth | F | 605 | 540-4707 | Kyle | MO | 57648 | M | N | 10000 | 0 | 0 | 0 | 0 |

TABLE 1

FIG. 1

| FDs Axiom | DCs form |
|---|---|
| $A \to A$ is trivial | $\neg(t_\alpha.A = t_\beta.A \wedge t_\alpha.A \neq t_\beta.A)$ is trivial |
| If $A \to B$, then $A, C \to B$ | If $\neg(t_\alpha.A = t_\beta.A \wedge t_\alpha.B \neq t_\beta.B)$, then $\neg(t_\alpha.A = t_\beta.A \wedge t_\alpha.C = t_\beta.C \wedge t_\alpha.B \neq t_\beta.B)$ |
| If $A \to B$, and $B \to C$, then $A \to C$ | If $\neg(t_\alpha.A = t_\beta.A \wedge t_\alpha.B \neq t_\beta.B)$, and $\neg(t_\alpha.B = t_\beta.B \wedge t_\alpha.C \neq t_\beta.C)$, then $\neg(t_\alpha.A = t_\beta.A \wedge t_\alpha.C \neq t_\beta.C)$ |

TABLE 3

B. Soundness Proof for Algorithm 1

We prove the soundness by induction. Let $Clo_j$ be the value of $Clo_{\varphi_j}(P)$ after $j$ iterations of line 15 for some fixed execution of Algorithm 1 on input $\Sigma$ and $W$. Initially $Clo_0 = Imp(W)$. $\forall P \in W, \forall R \in Imp(P), P \Rightarrow R$, taking the contrapositive we get $\overline{R} \Rightarrow \overline{P}$. Thus $\overline{R} \wedge W \Rightarrow \overline{P} \wedge W$. Taking the contrapositive, we get $\neg(\overline{P} \wedge W) \Rightarrow \neg(\overline{R} \wedge W)$. Since $\neg(\overline{P} \wedge P)$ is trivially satisfied, thus $\neg(\overline{R} \wedge W)$ is also satisfied by any instance. Suppose inductively $Clo_j$ is correct according to the definition after $j$ iterations of line 15. Assume $\varphi$ is the DC chosen in $j+1$ iteration, by induction, all predicates except $P = \varphi.pop()$ has been included in the closure. $\forall R \in Imp(\overline{P})$, by similar reasoning as initialization, $\neg(W \wedge \overline{R})$ is a valid DC.

FIG. 4

C.1 Soundness Proof for Algorithm 2

If $\exists \phi \in \Gamma$, s.t. $\phi.Pres \subseteq Clo_\Gamma(\varphi.Pres)$, let $\phi.Pres = \{R_1, R_2, \ldots, R_m\}$. According to the definition of closure, we have $m$ valid DCs, $i \in [1, m], \varphi_i : \neg(\varphi.Pres \wedge \overline{R_i})$. Repeatedly apply transitive on $\varphi_1, \ldots, \varphi_m$ and $\phi$, we have that $\neg(\varphi.Pres)$, i.e. $\varphi$, is a valid DC.

C.2 Counterexample for Algorithm 2

Consider a $\Sigma$ consists of 6 DCs, $\phi_1 : \neg(P_1 \wedge Q_1 \wedge Q_2)$, $\phi_2 : \neg(R \wedge \overline{Q_1})$, $\phi_3 : \neg(R \wedge \overline{Q_2})$, $\phi_4 : \neg(P_2 \wedge Q_3 \wedge Q_4)$, $\phi_5 : \neg(\overline{R} \wedge Q_3)$, and $\phi_6 : \neg(\overline{R} \wedge \overline{Q_4})$. Applying Axiom Transitivity twice on $\phi_1$, $\phi_2$, and $\phi_3$, we would get a valid DC $\phi_7 : \neg(P_1 \wedge R)$. Applying Axiom Transitivity twice on $\phi_4$, $\phi_5$, and $\phi_6$, we would get a valid DC $\phi_8 : \neg(P_2 \wedge \overline{R})$. Applying Transitivity on $\phi_7$ and $\phi_8$, we would finally get $\phi_9 : \neg(P_1 \wedge P_2)$. However Algorithm 2 would fail to detect $\Sigma \models \phi_9$.

FIG. 5

Algorithm 7 SEARCH $\epsilon$-MINIMAL COVERS

Input:
1. Input Evidence set, $Evi$
2. Evidence set not covered so far, $Evi_{curr}$
3. The current path in the search tree, $X \subseteq P$
4. The current partial ordering of the predicates, $>_{curr}$
5. The DCs discovered so far, $\Sigma$

Output: A set of minimal covers for $Evi$, denoted as $MC$

1: *Branch Pruning*
2: $\overline{P} \leftarrow X.last$ // Last Predicate added into the path
3: if $\exists Q \in \overline{X} - \overline{P}$, s.t. $P \in Imp(Q)$ then
4:    return //Triviality pruning
5: if $\exists Y \in MC$, s.t. $X \supseteq Y$ then
6:    return //Subset pruning based on $MC$
7: if $\exists Y = \{Y_1, \ldots, Y_n\} \in MC$, and $\exists i \in [1, n]$, and $\exists Q \in Imp(Y_i)$, s.t. $Z = Y_{-i} \cup \overline{Q}$ and $X \supseteq Z$ then
8:    return //Transitive pruning based on $MC$
9: if $\exists \varphi \in \Sigma$, s.t. $\overline{X} \supseteq \varphi.Pres$ then
10:    return //Subset pruning based on previous discovered DCs
11: *Base cases*
12: if $>_{curr} = \emptyset$ and $Sum(count(E)) > \epsilon |I|(|I| - 1)$, where $E \in Evi_{curr}, X \cap E = \emptyset$ then
13:    return //No DCs in this branch
14: if $Sum(count(E)) \leq \epsilon |I|(|I| - 1)$, where $E \in Evi_{curr}, X \cap E = \emptyset$ then
15:    if no subset of size $|X| - 1$ is a $\epsilon$-cover for $Evi_{curr}$ then
16:      $MC \leftarrow MC + X$
17:    return //Got a cover
18: *Recursive cases*
19: for all Predicate $P \in >_{curr}$ do
20:    $X \leftarrow X + P$
21:    $Evi_{next} \leftarrow$ remaining evidence sets in $Evi_{curr}$ not yet covered by $P$
22:    $>_{next} \leftarrow$ the total ordering of $\{P'|P >_{curr} P'\}$ according to $Evi_{next}$
23:    SEARCH MINIMAL COVERS($Evi$, $Evi_{next}$, $X$, $>_{next}$, $\Sigma$)
24:    $X \leftarrow X - P$

FIG. 7

| Dataset | DC Discovered | Semantic |
|---|---|---|
| Tax | $\forall (t_\alpha.ST = t_\beta.ST \wedge t_\alpha.SAL < t_\beta.SAL \wedge t_\alpha.TR > t_\beta.TR)$ | There cannot exist two persons who live in the same state, but one person earns less salary and have higher tax rate at the same time. |
| Tax | $\forall (t_\alpha.CH \neq t_\beta.CH \wedge t_\alpha.STX < t_\beta.CTX \wedge t_\alpha.STX < t_\beta.CTX)$ | There cannot exist two persons with both having CTX higher than STX, but different CH. If a person has CTX, she must have children. |
| Tax | $\forall (t_\alpha.MS \neq t_\beta.MS \wedge t_\alpha.STX = t_\beta.STX \wedge t_\alpha.STX > t_\beta.CTX)$ | There cannot exist two persons with same STX, one person has higher STX than CTX and they have different MS. If a person has STX, she must be single. |
| Hospital | $\forall (t_\alpha.MC = t_\beta.MC \wedge t_\alpha.MN \neq t_\beta.MN)$ | Measure code determines Measure name. |
| Hospital | $\forall (t_\alpha.PN = t_\beta.PN \wedge t_\alpha.PHO \neq t_\beta.PHO)$ | Provider number determines Phone number. |
| SP Stock | $\forall (t_\alpha.Open > t_\beta.High)$ | The open price of any stock should not be greater than its high of the day. |
| SP Stock | $\forall (t_\alpha.Date = t_\beta.Date \wedge t_\alpha.Ticker = t_\beta.Ticker)$ | Ticker and Date is a composite key. |

TABLE 5

FIG. 9

METHODS FOR IDENTIFYING DENIAL CONSTRAINTS

CROSS-REFERENCE TO RELATED APPLICATIONS

This application is a National stage entry under 35 U.S.C. § 371 of PCT Patent Application No. PCT/EP2013/061326, filed May 31, 2013, which is incorporated entirely by reference herein.

BACKGROUND

The present disclosure relates to a method for identifying denial constraints, the denial constraints being used in multiple applications, including but not limited to for use in reviewing data, sanity checking data, identifying errors and/or correcting errors in data stored in a database.

As businesses generate and consume data more than ever, it is critical to enforce and maintain the quality of the data assets. One in three business leaders does not trust the information used to make decisions, since establishing trust in data becomes a challenge as the variety and the number of sources grow. For example, in healthcare domains, inaccurate or incorrect data may threaten patient safety. Therefore, data review, validation and/or cleaning is a task towards improving data quality, which is estimated to account for 30%-80% of the cost of a typical data warehouse project.

Integrity constraints (ICs), originally designed to improve the quality of a database schema, have been recently repurposed towards improving the quality of data, either through checking the validity of the data at points of entry, or by cleaning the data at various points during the processing pipeline. Traditional types of ICs, such as key constraints, check constraints, functional dependencies (FDs), and their extension conditional functional dependencies (CFDs) have been proposed for data quality management. However, there is still a large space of ICs that cannot be captured using the aforementioned types.

SUMMARY

Example 1

Consider the US tax records in Table 1 shown in FIG. 1. Each record describes an individual address and tax information with 15 attributes: first and last name (FN, LN), gender (GD), area code (AC), mobile phone number (PH), city (CT), state (ST), zip code (ZIP), marital status (MS), has children (CH), salary (SAL), tax rate (TR), tax exemption amount if single (STX), married (MTX), and having children (CTX).

Suppose that the following constraints hold: (1) there cannot exist two persons who have the same area code and phone; (2) there cannot exist two persons who live in the same zip code with different states; (3) there cannot exist a person who lives in Los Angeles but not in California; (4) there cannot exist two persons who live in the same state, but one person earns less salary and has higher tax rate at the same time; and (5) there cannot exist any person whose single tax exemption is greater than salary.

Constraints (1), (2), and (3) can be expressed as a key constraint, an FD, and a CFD.

(1): {AC, PH}
(2): ZIP→ST
(3): [CT='Los Angeles']→[ST='CA']

Since Constraints (4) and (5) involve order predicates (>, <), and (5) compares different attributes in the same predicate, they cannot be expressed by FDs and CFDs. However, they can be expressed in first-order logic:

$$\forall t_\alpha, t_\beta \in r, \neg(t_\alpha.ST=t_\beta.ST \wedge t_\alpha.SAL<t_\beta.SAL \wedge t_\alpha.TR>t_\beta.TR) \quad c_4:$$

$$\forall t_\alpha \in r, \neg(t_\alpha.SAL<t_\alpha.STX) \quad c_5:$$

Since first-order logic is more expressive, Constraints (1)-(3) can also be expressed as follows:

$$\forall t_\alpha, t_\beta \in r, \neg(t\alpha.AC=t_\beta.AC \wedge t_\alpha.PH=t_\beta.PH) \quad c_1:$$

$$\forall t_\alpha, t_\beta \in r, \neg(t_\alpha.ZIP=t_\beta.ZIP \wedge t_\alpha.ST \neq t_\beta.ST) \quad c_2:$$

$$\forall t_\alpha \in r, \neg(t_\alpha.CT=\text{'Los Angeles'} \wedge t_\alpha.ST \neq \text{'CA'}). \quad c_3:$$

The more expressive power an IC language has, the harder it is to exploit, for example, in automated data cleaning algorithms or in writing SQL queries for consistency checking. There is an infinite space of business rules up to ad-hoc programs for enforcing correct application semantics and business logic. There is a need to achieve a balance between the expressive power of ICs to deal with a broader space of business rules and, the restrictions required to ensure adequate static analysis of ICs and the development of effective cleaning and discovery algorithms.

Denial Constraints (DCs), are a universally quantified first order logic formalism, that can express all constraints in Example 1 since DCs are more expressive than key constraints, FDs, and CFDs. DCs serve as a good compromise between expressiveness and complexity for the following reasons: (1) DCs are defined on predicates that can be easily expressed in SQL queries for consistency checking; (2) DCs have been proven to be a useful language for data cleaning in many aspects, such as data repairing, consistent query answering, and expressing data currency rules; and (3) while static analysis of DCs is un-decidable, it is possible to develop a set of sound inferences rules and a linear implication testing algorithm for DCs that enable an efficient adoption of DCs as an IC language.

Conventional methods which use DCs as a language formalism for data quality management do not, however, provide a suitable method for acquiring DCs. While DCs can be obtained by consulting domain experts, this is a time consuming and expensive process which requires expertise in the constraint language at hand. Moreover, such rules can introduce mistakes due to human error, or the rules may even be impossible to design when an expert for a new domain is not available.

The present disclosure seeks to provide an improved method for identifying denial constraints.

According to one aspect of the present disclosure, there is provided a method of identifying denial constraints, the denial constraints being for use with a database schema R, the method comprising: generating a predicate space P for an instance I in the schema R, generating an evidence set $Evi_I$ which comprises sets of satisfied predicates in the predicate space P for each instance I, identifying a minimal set of predicates for the evidence set $Evi_I$, and identifying valid denial constraints from the minimal set by inverting the predicates in the minimal set.

According to one or more embodiments described herein, generating the predicate space P comprises: for each attribute in the schema R, adding equality predicates describing equality and inequality between two tuples on an attribute and adding cross column predicates for joinable column pairs, for each numerical attribute in the schema R, adding order predicates describing greater than, greater than or equal to, less than or equal to, or less than between two tuples on an attribute, and adding cross column order predicates for comparable column pairs.

According to one or more embodiments described herein, the predicate space P is generated using the algorithm:

---

Input: One relational instance I, schema R
Output: Predicate space P
1: for all A ∈ R do
2:    P ← $t_\alpha.A\theta t_\beta.A$, where θ ∈ {=, ≠}
3:    if A is numerical type then
4:        P ← P + $t\alpha.A\theta\beta.A$, where θ ∈ {>, ≤, <, ≥}
5: Profiling to find joinable column pairs EQColPairs
6: for all⟨A, B⟩ ∈ EQColPairs do
7:    P ← P + $t_\alpha.A\theta t_\alpha.B$, where θ ∈ {=, ≠}
8:    P ← P + $t_\alpha.A\theta t_\beta.B$, where θ ∈ {=, ≠}
9: Profiling to find comparable column pairs OrderColPairs
10: for all⟨A, B⟩ ∈ OrderColPairs do
11:    P ← P + $t_\alpha.A\theta t_\alpha.B$, where θ ∈ {>, ≤, <, ≥}
12:    P ← P + $t_\alpha.A\theta t_\beta.B$, where θ ∈ {>, ≤, <, ≥}.

---

According to one or more embodiments described herein, the evidence set $Evi_I$ is generated using the algorithm:

---

Input: One relational instance I, predicate space P
Output: $Evi_I$
1: for Tuple $t_x$ ∈ I do
2:    for Tuple $t_y$ ∈ I do
3:        if $t_x = t_y$ then
4:            continue
5:        SAT ← ø
6:        for P ∈ P do
7:            if⟨$t_x,t_y$⟩ |= P then
8:                SAT ← SAT + P
9:        if SAT ∉ $Evi_I$ then
10:            $Evi_I$ ← $Evi_I$ + SAT.

---

According to one or more embodiments described herein, the method further comprises dividing the space of the valid denial constraints into a plurality of subspaces that each comprise a first predicate $P_1$.

According to one or more embodiments described herein, the method further comprises dividing the plurality of subspaces into a plurality of further subspaces that each comprise a second predicate $P_2$.

According to one or more embodiments described herein, the method further comprises ordering the valid denial constraints in a taxonomy tree according to the predicates in each denial constraint.

According to one or more embodiments described herein, the method further comprises searching for denial constraints by searching the taxonomy tree from the bottom-up.

According to one or more embodiments described herein, the method further comprises pruning branches from the taxonomy tree which comprise valid denial constraints identified by the search and performing a further search of the taxonomy tree from the bottom-up.

According to one or more embodiments described herein, the method further comprises providing a scoring function to provide a ranking of discovered denial constraints.

According to one or more embodiments described herein, the scoring function comprises assigning an interestingness score Inter(φ) to each denial constraint φ, the score Inter(φ) being a weighted combination of the succinctness and coverage of each denial constraint φ.

According to one or more embodiments described herein, a U-Precision metric is provided which identifies whether a denial constraint is schema-conforming:

$$U\text{-Precision}(\Sigma_S) = \frac{|\Sigma_u|}{|\Sigma_s|},$$

where the discovered DCs are denoted by $\Sigma_s$ and $\Sigma_u$ is the DCs in $\Sigma_s$ that are verified as gold standard.

According to one or more embodiments described herein, the succinctness is defined as:

$$Succ(\varphi) = \frac{\text{Min}(\{\text{Len}(\phi) \mid \forall \phi\})}{\text{Len}(\varphi)}$$

According to one or more embodiments described herein, the coverage is defined as:

$$\text{Coverage}(\varphi) = \frac{\sum_{k=0}^{|\varphi\text{-Pres}|-1} |kE| * w(k)}{|I| \times (|I| - 1)}$$

According to one or more embodiments described herein, approximate DCs are identified by: given a relational schema R and instance I, finding a minimal cover Σ of valid DCs, where a DC φ is valid if the percentage of violations of φ on I, i.e., number of violations of φ on I divided by total number of tuple pairs |I|(|I|−1), is within a threshold ε.

According to another aspect of the present disclosure, there is provided a system operable to identify denial constraints, the denial constraints being for use with a database schema R, the system comprising: a mechanism operable to generate a predicate space P for an instance I in the schema R, a mechanism operable to generate an evidence set $Evi_I$ which comprises sets of satisfied predicates in the predicate space P for each instance I, a mechanism operable to identify a minimal set of predicates for the evidence set $Evi_I$, and to identify valid denial constraints from the minimal set by inverting the predicates in the minimal set.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 depicts table (Table 1) showing data representing US tax records for Example 1 according to one or more embodiments shown and described herein;

FIG. 2 depicts table (Table 3) of FDs Axioms and their corresponding DCs forms according to one or more embodiments shown and described herein;

FIG. 3 shows a soundness proof and completeness proof of the algorithms of an interference system according to one or more embodiments shown and described herein;

FIG. 4 shows a soundness proof for Algorithm 1 according to one or more embodiments shown and described herein;

FIG. 5 shows a soundness proof for Algorithm 2 and a counterexample for Algorithm 2 according to one or more embodiments shown and described herein;

FIG. 7 schematically depicts algorithm (Algorithm 7) to search ε-minimal covers according to one or more embodiments shown and described herein;

FIG. 9 depicts table (Table 5) showing sample denial constraints identified in the example datasets according to one or more embodiments shown and described herein.

DETAILED DESCRIPTION

1.1 Challenges with Identifying Denial Constraints

Figure 6:
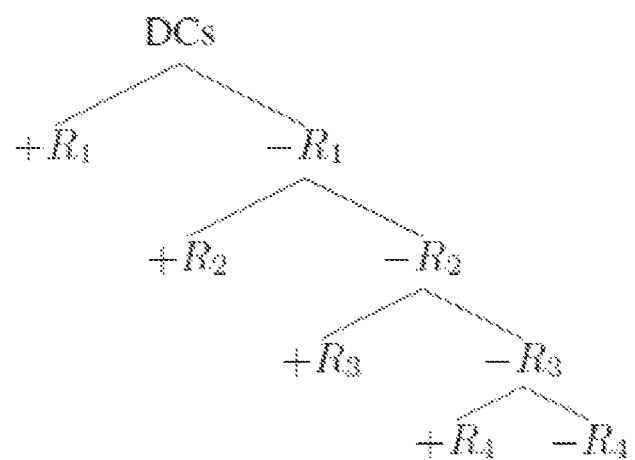
FIG. 6 schematically depicts diagram of an example taxonomy tree according to one or more embodiments shown and described herein.

Three main technical challenges hinder the adoption of DCs as an efficient IC language and in discovering DCs from an input data instance:

(1) Theoretical Foundation

The necessary theoretical foundations for DCs as a constraint language are missing. Armstrong Axioms and their extensions are at the core of state-of-the-art algorithms for inferring FDs and CFDs, but there is no similar foundation for the design of tractable DCs discovery algorithms.

Example 2

Consider the following constraint, $c_6$, which states that there cannot exist two persons who live in the same zip code and one person has a lower salary and higher tax rate.

$$\forall t_\alpha, t_\beta \in r, \neg(t_\alpha.\text{ZIP}=t_\beta.\text{ZIP} \wedge t_\alpha.\text{SAL}<t_\beta.\text{SAL} \wedge t_\alpha.\text{TR}>t_\beta.\text{TR})c_6 \qquad c_6:$$

is implied by $c_2$ and $c_4$: if two persons live in the same zip code, by $c_2$ they would live in the same state and by $c_4$ one cannot earn less and have higher tax rate in the same state.

In order to systematically identify implied DCs (such as $c_6$), for example, to prune some redundant DCs, a reasoning system for DCs needs to be built.

(2) Space Explosion

Consider a Functional Dependency (FD) discovery on schema R, let |R|=m. Taking an attribute as the right hand side of an FD, any subset of remaining $m^{-1}$ attributes could serve as the left hand side. Thus, the space to be explored for FDs discovery is $m*2^{r-1}$. Now consider discovering DCs involving at most two tuples; a predicate space needs to be defined, upon which the space of DCs is defined. The structure of a predicate consists of two different attributes and one operator. Given two tuples, we have 2 m distinct attributes; and six operators (=, ≠, >, ≤, <, ≥) are allowed. Therefore, the size of the predicate space P is: |P|=6*2 m*(2m−1). Any subset of the predicate space could constitute a DC. Therefore, the search space for DCs discovery is of size $2^{|P|}$.

Evidently, DCs discovery has a much larger space to explore, further justifying the need for a reasoning mechanism to enable efficient pruning, as well as the need for an efficient discovery algorithm.

(3) Ranking and Overfitting

Conventional model discovery algorithms suffer from the problem of overfitting; DCs discovered on the input instance I of schema R may not hold on future data of R. A discovered DC is said to be schema-conforming if it not only applies to current data, but also on future, unseen data. This is illustrated below in Example 3.

Example 3

Consider DC $c_7$ on Table 1 shown in FIG. 1, which states that first name determines gender.

$$\forall t_\alpha, t_\beta \in r, \neg(t_\alpha.\text{FN}=t_\beta.\text{FN} \wedge t_\alpha.\text{GD}\neq t_\beta.\text{GD}) \qquad c_7:$$

Even if $c_7$ is true on current data, common knowledge suggests that it does not hold in general.

Since the quality of ICs is crucial for data quality, discovered ICs are usually verified by domain experts for their validity. Statistical measures may be used to rank constraints and assist in the verification step for specific cases. For example, for CFDs it is possible to count the number of tuples that match their tableaux. Similar support measures are used for association rules.

Unfortunately, discovered DCs are more difficult to verify and rank than previous formalisms for three reasons: (1) similarly to FDs, it not possible to only count constants to measure support; (2) given the explosion of the space, the number of discovered DCs is much larger than the size of discovered FDs; (3) the semantics of FDs/CFDs is much easier to understand compared to DCs.

However, by looking carefully at the sample data, different kinds of evidence can be exploited to estimate if a DC is schema-conforming. For example, while both pairs of tuples $t_4, t_7$ and $t_2, t_6$ do not violate $c_2$, it is clear that $t_4, t_7$ gives more support for $c_2$.

Looking at the available data, the applicants see that there are two kinds of evidence that we can exploit to rank DCs effectively. The first one is the size of the constraints. Shorter DCs are easier to read and follow the Occam's razor principle: among competing hypotheses, the one making fewer assumptions is preferred. The second one is the support coming from the data. Every discovered DC holds on the entire dataset, and we cannot just count constants as for CFDs, therefore a more sophisticated definition of coverage is needed. For example, the measure should capture that $c_2$ has more coverage than $c_7$, because the pairs of tuples $t_4; t_7$ and $t_1; t_8$ give more support than any other pairs of tuples for $c_2$, while $c_7$ has only one pair $t_1; t_6$.

1.2 Discovering Denial Constraints

Given the DCs discovery problem and the above challenges, different embodiments of the present disclosure invention seek to provide the following three contributions:

1. A formal problem definition of discovering DCs. Static analysis for DCs is described below with three axioms that serve as the basis for an implication testing algorithm as well as for a DCs discovery algorithm. Determining whether a set of DCs implies another DC is un-decidable in general, an algorithm is therefore described below with linear time complexity for implication testing.

2. A DCs discovery algorithm, known as FASTDC, is described below. FASTDC starts by building a predicate space and calculates evidence sets for the predicate space. The connection between discovering minimal DCs and finding minimal set covers is then established for evidence sets. A depth-first search (DFS) strategy is employed for finding minimal set covers and DC axioms are used for branch pruning. In order to handle datasets that may have data errors, we extend the algorithm to discover approximate DCs.

3. A rank-based method which is a solution to the overfitting problem is described below and presents a novel scoring function for a DC. The scoring function is known herein as the "interestingness" of a DC which combines succinctness and coverage measures of discovered DCs in order to enable their ranking and pruning based on thresholds, thus reducing the cognitive burden for human verification.

The techniques are verified on real-life and synthetic data. The discussion below demonstrates that FASTDC is bound by the number of tuples |I| and by the number of DCs, and that the polynomial part with respect to |I| can be easily parallelized. The implication testing algorithm is shown to substantially reduce the number of DCs in the output, thus reducing users' effort in verifying discovered DCs.

1.3 Outline

Related technology is initially discussed below (Section 2). DCs and the problem definition of discovering DCs are then defined (Section 3), followed by their static analysis (Section 4). Details of the discovery algorithm FASTDC (Section 5) and of a scoring function (Section 6) are then described. Finally, an experimental study of the techniques (Section 7) is discussed.

2. Related Technology

The technology of an embodiment of the disclosure has similarities to several bodies of work: static analysis of FDs and CFDs, dependency discovery, and scoring of ICs. Whenever a dependency language is proposed, the static analysis should be investigated, including logical implication, consistency checking, and finite axiomatization. Static analysis for FDs is known and can be done in linear time with respect to the number of FDs. Three inferences rules are proven to be sound and complete.

Conditional functional dependencies (CFDs) were proposed when implication and consistency problems were shown to be intractable. In addition, a set of sound and complete inference rules were also provided, which were later simplified. Though denial constraints have been used for data cleaning as well as consistent query answering, static analysis has been done only for special fragments, such as currency rules. Dependency discovery has long been a subject of interest in communities of database, knowledge discovery and machine learning. Among the various topics of constraint discovery, FDs discovery attracted the most attention and whose methodology can be divided into schema-driven, top-down approaches and instance-driven, bottom-up approaches.

TANE is a representative for the schema-driven approach. It adopts a level-wise candidate generation and pruning strategy and relies on a linear algorithm for checking the validity of FDs. TANE is sensitive to the size of the schema. FASTFD is a representative for the instance-driven approach. It first computes agree-sets from data, then adopts a heuristic-driven depth first search algorithm to search for covers of agree-sets. FASTFD is sensitive to the size of the instance. Both algorithms were extended for discovering CFDs, which also includes a fast algorithm for constant CFDs discovery.

Another element of discovering ICs is to measure the importance of ICs according to a scoring function. In FDs discovery, the statistical correlations for each column pair are examined to discover soft FDs. In CFDs discovery some measures have been proposed, including support, which is defined as the percentage of the tuples in the data that match the pattern tableaux, conviction, and $\chi^2$ test. However, none of these measures the extent to which the discovered ICs will conform to unseen data. Interest measures for CFDs are based on the matching of constant patterns in the input data, that is designed to reduce the amount of CFDs in the output. Therefore, the schema-conforming scoring function of an embodiment of the disclosure is fundamentally different from previously proposed scoring functions for discovered ICs.

3. Denial Constraint and Discovery Problem

In this section, the syntax and semantics of DCs are first reviewed. Then, minimal DCs are defined and the discovery problem for DCs is described.

3.1 Denial Constraints (DCs)

Syntax: Consider a database schema of the form S=(U, R,B) where U is a set of database domains, R is a set of database predicates or relations, and B is a set of finite built-in operators. In this paper, B={=, <, >, ≠, ≤, ≥,}. B must be negation closed to define the inverse of operator $\phi$ as $\bar{\phi}$.

The subset of integrity constraints identified by denial constraints (DCs) is supported over relational databases. Tuple based DC notation is used of the form:

$$\forall t_\alpha, t_\beta, t_\gamma \ldots \in R, \neg(P_1 \wedge \ldots \wedge P_m) \qquad \varphi:$$

where $P_i$ is of the form $v_1 \phi v_2$ or $v_1 \phi c$ with $v_1, v_2 \in t_x.A$, $x \in \{\alpha, \beta, \gamma, \ldots\}$, $A \in R$, and c is a constant. For the sake of simplicity, the above notation assumes there is only one relation R in R.

For a DC $\varphi$, if $\forall P_i, i \in [1, m]$ is of the form $v_1 \phi v_2$ then such DC is called a variable denial constraint (VDC), otherwise, $\varphi$ is a constant denial constraint (CDC).

The inverse of predicate P: $v_1 \phi_1 v_2$ is $\bar{P}$: $v_1 \phi_2 v_2$, where $\phi_2 = \bar{\phi}_1$. If P is true, then $\bar{P}$ is false. The set of implied predicates of P is Imp(P)={Q|Q: $v_1 \phi_2 v_2$}, where $\phi_2 \in$ Imp($\phi_1$). If P is true, then $\forall Q \in$ Imp(P), Q is true. The inverse and implication of the six operators in B is summarized below in Table 2.

TABLE 2

| $\phi$ | = | ≠ | > | < | ≥ | ≤ |
|---|---|---|---|---|---|---|
| $\bar{\phi}$ | ≠ | = | ≤ | ≥ | < | > |
| Imp($\phi$) | =, ≥, ≤ | ≠ | >, ≥, ≠ | <, ≤, ≠ | ≥ | ≤ |

Semantics: Intuitively, a DC states that all the predicates cannot be true at the same time, otherwise there is a violation. Single-tuple constraints (such as SQL CHECK constraints), FDs, and CFDs are special cases of unary and binary denial constraints with equality and inequality predicates. Given a database instance I of schema S and a DC $\varphi$, if I satisfies $\varphi$, one writes I⊨$\varphi$, and one says that $\varphi$ is a valid DC. If there is a set of DC Σ, I⊨Σ if and only if $\forall \varphi \in \Sigma$, I⊨$\varphi$. Σ implies $\varphi$, i.e., Σ⊨$\varphi$, if for every instance I of S, if I⊨Σ, then I⊨$\varphi$.

The following description focuses on DCs with at most two tuples but it is to be appreciated that other embodiments of the disclosure are configured to operate on DCs with more than two tuples. DCs involving more tuples are, however, less likely in real life and incur bigger predicate space to search, as shown below in Section 5.

The universal quantifier for DCs with at most two tuples is $\forall t_\alpha, t_\beta$. Universal quantifiers are omitted in the description below for simplicity purposes. The notations we use in the description are summarised below in Table 7.

TABLE 7

| Symbol | Meaning |
|---|---|
| P, Q, R | Single Predicate |
| P, Q, R, W, X, Y | Set of Predicates |
| $\varphi$.Pres | Set of Predicates in DC $\varphi$ |
| P$_{-i}$ | A subset of predicates in P except $P_i$ |
| $\bar{\mathbf{P}}$ | Reverse each predicate in the set |

TABLE 7-continued

| Symbol | Meaning |
| --- | --- |
| c, φ, ϕ | Single DCs |
| Σ, Γ | Set of DCs |

3.2 Problem Definition

In this subsection, trivial, minimal, and symmetric DCs are defined initially, and then the problem statement of discovering DCs is discussed.

Trivial, Minimal and Symmetric DC.

A DC $\neg(P_1 \wedge \ldots \wedge P_n)$ is said to be trivial if it is satisfied by any instance. In the description below, only nontrivial DCs are considered unless otherwise specified.

DC $\varphi_1$ is said to be set-minimal, or minimal, if $\not\exists$ $\varphi_2$, such that $\varphi_1 \models \varphi_2$, $\varphi_2 \models \varphi_1$ and $\varphi_2.\text{Pres} \subset \varphi_1.\text{Pres}$.

The symmetric DC of a DC $\varphi_1$ is a DC $\varphi_2$ by substituting $t_\alpha$ with $t_\beta$, and $t_\beta$ with $t_\alpha$.

Theorem 1.

If $\varphi_1$ and $\varphi_2$ are symmetric DCs, then $\varphi_1 \models \varphi_2$ and $\varphi_2 \models \varphi_1$.

Example 4 described below illustrates above definitions.

Example 4

Consider three additional DCs for Table 1.

$\neg(t_\alpha.\text{SAL}=t_\beta.\text{SAL} \wedge t_\alpha.\text{SAL}>t_\beta.\text{SAL})$     $c_{10}$:

$\neg(t_\alpha.\text{PH}=t_\beta.\text{PH}))$     $c_{11}$:

$\forall t_\alpha, t_\beta \in r; \neg(t_\alpha.\text{ST}=t_\beta.\text{ST} \wedge t_\alpha.\text{SAL}>t_\beta.\text{SAL}$
$\wedge t_\alpha.\text{TR}<t_\beta.\text{TR})$     $c_{12}$:

$c_{10}$ is a trivial DC, since there cannot exist two persons that have the same salary, and one's salary is greater than the other. If tuple $t_x$ in Table 1 is removed, $c_{11}$ becomes a valid DC, making $c_1$ no longer minimal. $c_{12}$ and $c_4$ are symmetric DCs.

A canonical cover of DCs on r is a set of minimal DCs on r, such that it is equivalent to all DCs that hold on r.

Problem Statement.

Given a relational schema R and an instance I, the discovery problem for DCs is to find a canonical cover of DCs that hold on I. Since the number of DCs that hold on a dataset is usually very big, the problem of ranking DCs with an objective function is described below in Section 6.

4. Static Analysis of DCs

Since DCs subsume FDs and CFDs, it is natural to ask whether one can perform reasonings the same way as FDs or CFDs. Is there a sound and complete inference system for DCs? How hard is it to determine if a set of DCs implies another DC? These questions are relevant to discovering DCs because an inference system is needed for pruning DCs, and implication testing is required to reduce the number of DCs in the output.

4.1 Inference System

Armstrong Axioms for FDs are the fundamental building blocks for implication analysis for FDs. In this section three symbolic inference rules for DCs, denoted as I, analogous to Armstrong Axioms are discussed.

1. Triviality: $\forall P_i, P_j$ if $\overline{P_i} \in \text{Imp}(P_j)$, then $\neg(P_i \wedge P_j)$ is a trivial DC 2. Augmentation: If $\neg(P_1 \wedge \ldots \wedge P_n)$ is a valid DC, then $\neg(P_1 \wedge \ldots \wedge P_n \wedge Q)$ is also a valid DC 3. Transitivity: If $\neg(P_1 \wedge \ldots \wedge P_n \wedge Q_1)$ and $\neg(R_1 \wedge \ldots \wedge R_m \wedge Q_2)$ are valid DCs, and $Q_2 \in \text{Imp}(\overline{Q_1})$, then $\neg(P_1 \wedge \ldots \wedge P_n \wedge R_1 \wedge \ldots \wedge R_m)$ is also a valid DC Triviality states that if there are two predicates that cannot be true at the same time in a DC ($\overline{P_i} \in \text{Imp}(P_j)$), then the DC is trivially satisfied.

Augmentation states that if a DC is valid, adding more predicates will always result in a valid DC.

Transitivity states that if there are two DCs and two predicates (one in each DC) that cannot be false at the same time ($Q_2 \in \text{Imp}(\overline{Q_1})$), then merging two DCs plus removing those two predicates will result in a valid DC.

Since FDs are a subset of DCs, and Armstrong Axioms for FDs are well understood, we list in Table 3 (FIG. 2) FDs Axioms and their corresponding DCs forms to clarify DCs inference system I.

Inference system I is a syntactic way of checking whether a set of DCs Σ implies a DC φ. It is sound in that if by using I a DC φ can be derived from Σ, i.e., $\Sigma \vdash_I \varphi$ then Σ implies φ, i.e., $\Sigma \models \varphi$. The completeness of I dictates that if $\Sigma \models$, then $\Sigma \vdash_I \varphi$. We identify a specific form of DCs, for which I is complete. The specific form requires that each predicate of a DC is defined on two tuples and on the same attribute, and that all predicates must have the same operator θ except one that must have the reverse of θ.

Theorem 2.

The inference system I is sound for DCs. It is also complete for VDCs of the form $\forall t_\alpha, t_\beta \in r, \neg(P_1 \wedge \ldots \wedge P_m \wedge Q)$, where $P_i=t_\alpha.A_i \theta t_\beta.A_i$, $\forall i \in [1, m]$ and $Q=t_\alpha.B\overline{\theta}t_\beta.B$ with $A_i$, $B \in U$.

Figure 3:
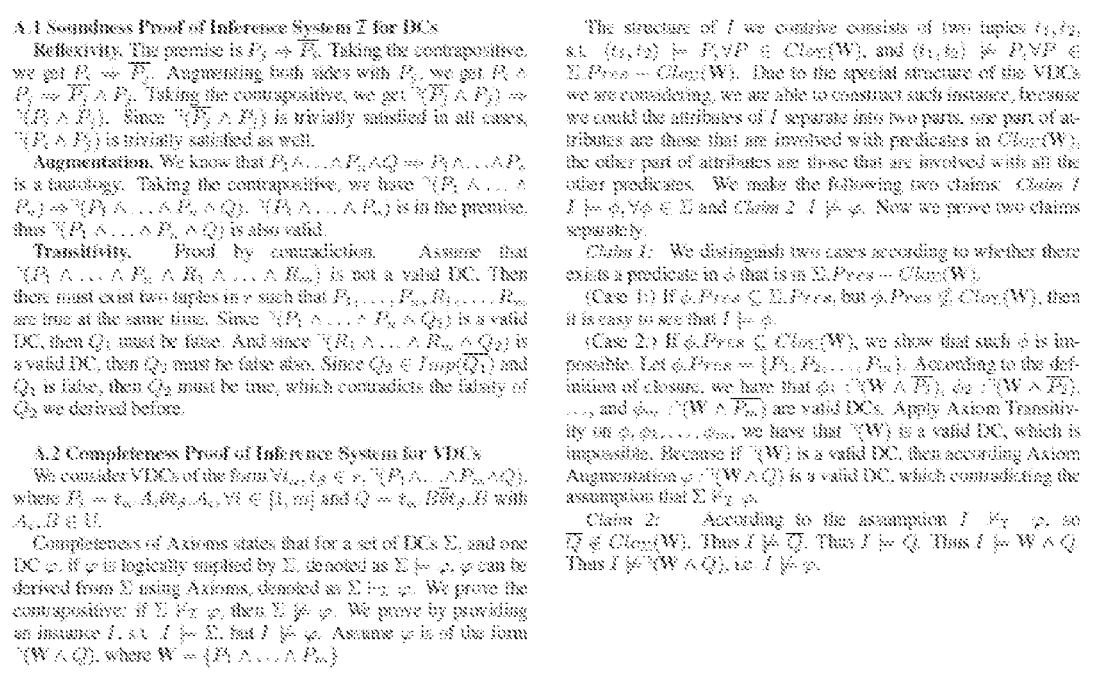

A formal proof of Theorem 2 is set out in FIG. 3. The completeness result for the inference system I for that form of DCs generalizes the completeness result of Armstrong Axioms for FDs. In particular, FDs adhere to the form with θ being =.

However, the discussion of the experiments indicates that, the axioms have an impact on the pruning power of the implication test and of the FASTDC algorithm.

The partial completeness result for the inference system has no implication on the completeness of the discovery algorithms described in Section 5. However, the experiments discuss that, although not complete, the inference system I has a huge impact on the pruning power of the implication test and of the FASTDC algorithm.

4.2 Implication Problem

Implication testing refers to the problem of determining whether a set of DC Σ implies another DC φ. It has been established that the complexity of the implication testing problem for DCs is coNP-Complete. Given the intractability result, a linear algorithm is described below for implication testing in order to reduce the number of DCs in the discovery algorithm output.

In order to devise an efficient implication testing algorithm, the concept of closure is defined in Definition 1 for a set of predicates W under a set of DCs Σ. A predicate P is in the closure if adding $\overline{P}$ to W would constitute a DC implied by Σ. This is similar to the closure of a set of attributes under a set of FDs.

Definition 1.

The closure of a set of predicates W, with respect to a set of DCs Σ, is a set of predicates, denoted as $\text{Clo}_\Sigma(W)$, such that $\forall P \in \text{Clo}_\Sigma(W), \Sigma \models \neg(W \wedge \overline{P})$.

Algorithm 1 calculates the partial closure of W under Σ, whose proof of correctness is set out in FIG. 4. $\text{Clo}_\Sigma(W)$ by initialised by adding every predicate in W and their implied predicates due to Axiom Triviality (Lines 1-2). Additional predicates are added that are implied by $\text{Clo}_\Sigma(W)$ through basic algebraic transitivity (Line 3). The closure is enlarged if there is a DC φ in Σ such that all but one predicates in φ are in the closure (Lines 15-23). Two lists are used to keep track of exactly when such condition is met (Lines 3-11).

Example 5

Consider $\Sigma=\{c_1, \ldots, c_6\}$ and $W=\{t_\alpha.\text{ZIP}=t_\beta.\text{ZIP}, t_\alpha.\text{SAL}<t_\beta.\text{SAL}\}$.

---

Algorithm 1 GET PARTIAL CLOSURE:

---

Input: Set of DCs $\Sigma$, Set of Predicates W
Output: Set of predicates called closure of W under $\Sigma$: $\text{Clo}_\Sigma(W)$
1: for all $P \in W$ do
2:    $\text{Clo}_\Sigma(W) \leftarrow \text{Clo}_\Sigma(W) + \text{Imp}(P)$
3:    $\text{Clo}_\Sigma(W) \leftarrow \text{Clo}_\Sigma(W) + \text{Imp}(\text{Clo}_\Sigma(W))$
4: for each predicate P, create a list $L_P$, which is the set of DCs containing P
5: for each DC $\varphi$, create a list $L_\varphi$, which is the set of predicates not yet included in the closure
6: for all $\varphi \in \Sigma$ do
7:    for all $P \in \varphi.\text{Pres}$ do
8:       $L_P \leftarrow L_P + \varphi$
9: for all $P \notin \text{Clo}_\Sigma(W)$ do
10:    for all $\varphi \in L_P$ do
11:       $L_\varphi \leftarrow L_\varphi + P$
12: create a list J, which is a queue of DC, which has all but one predicate in the closure
13: for all $\varphi \in \Sigma$ do
14:    if $|L_\varphi| = 1$ then
15:       $J \leftarrow J + \varphi$
16: while $|J| > 0$ do
17:    $\varphi \leftarrow J.\text{pop}()$
18:    $\overline{P} \leftarrow L_\varphi.\text{pop}()$
19:    for all $Q \in \text{Imp}(\overline{P})$ do
20:       for all $\varphi \in L_Q$ do
21:          $L_\varphi \leftarrow L_\varphi - Q$
22:          if $|L_\varphi| = 1$ then
23:             $J \leftarrow J + \varphi$
24:    $\text{Clo}_\Sigma(W) \leftarrow \text{Clo}_\Sigma(W) + \text{Imp}(\overline{P})$
25:    $\text{Clo}_\Sigma(W) \leftarrow \text{Clo}_\Sigma(W) + \text{Imp}(\text{Clo}_\Sigma(W))$
26: return $\text{Clo}_\Sigma(W)$

---

The initialization step in Lines (1-3) results in $\text{Clo}_\Sigma(W)=\{t_\alpha.\text{ZIP}=t_\beta.\text{ZIP}, t_\alpha.\text{SAL}<t_\beta.\text{SAL}, t_\alpha.\text{SAL}\leq t_\beta.\text{SAL}\}$. Now all predicates but one $t_\alpha.\text{ST}\neq t_\beta.\text{ST}$ in $c_2$ are in the closure, the implied predicates of the reverse of $t_\alpha.\text{ST}\neq t_\beta.\text{ST}$ are added to the closure. $\text{Clo}_\Sigma(W)=\{t_\alpha.\text{ZIP}=t_\beta.\text{ZIP}, t_\alpha.\text{SAL}<t_\beta.\text{SAL}, t_\alpha.\text{SAL}\leq t_\beta.\text{SAL}, t_\alpha.\text{ST}=t_\beta.\text{ST}\}$. Now $c_4$ is ready (Line 22), the implied predicates of the reverse $t_\alpha.\text{TR}>t_\beta.\text{TR}$ are added. The closure now is $\text{Clo}_\Sigma(W)=\{t_\alpha.\text{ZIP}=t_\beta.\text{ZIP}, t_\alpha.\text{SAL}<t_\beta.\text{SAL}, t_\alpha.\text{SAL}\leq t_\beta.\text{SAL}, t_\alpha.\text{TR}\leq t_\beta.\text{TR}\}$. No more DCs are in the queue (Line 16). Taking the reverse of $t_\alpha.\text{TR}\leq t_\beta.\text{TR}$, the result is $\Sigma\models c_7$.

Algorithm 2 below tests whether a DC $\varphi$ is implied by a set of DCs $\Sigma$ by computing the closure of $\varphi.\text{Pres}$ in $\varphi$ under $\Gamma$, which is $\Sigma$ enlarged with symmetric DCs. If there exists a DC $\varphi$ in $\Gamma$, whose predicates are a subset of the closure, $\varphi$ is implied by $\Sigma$. The proof of soundness of Algorithm 2 is set out below in FIG. 5. FIG. 5 also shows a counterexample where $\varphi$ is indeed implied by $\Sigma$, but Algorithm 2 fails to verify because Algorithm 2 computes only a partial closure.

Example 6

Consider a database with two numerical columns, High (H) and Low (L). Consider two DCs $c_{14}$, $c_{15}$:

$$\forall t_\alpha, (t_\alpha.H < t_\alpha.L) \quad c_{14}$$

$$\forall t_\alpha, t_\beta (t_\alpha.H > t_\beta.H \wedge t_\beta.L > t_\alpha.H) \quad c_{15}$$

The implication testing algorithm identifies how $c_{15}$ is implied by $c_{14}$. Let $\Sigma=\{c_{14}\}$ and $W=c_{15}.\text{Pres}$. $\Gamma=\{c_{14}, c_{16}\}$, where $c_{16}$: $\forall t_\beta, (t_\beta.H < t_\beta.H)$

---

Algorithm 2 IMPLICATION TESTING

---

Input: Set of DCs $\Sigma$, one DC $\varphi$
Output: A boolean value, indicating whether $\Sigma \models \varphi$
1: if $\varphi$ is a trivial DC then
2:    return true
3: $\Gamma \leftarrow \Sigma$
4: for $\varphi \in \Sigma$ do
5:    $\Gamma \leftarrow \Gamma + $ symmetric DC of $\varphi$
6: $\text{Clo}_\Gamma(\varphi.\text{Pres}) = \text{getClosure}(\varphi.\text{Pres},\Gamma)$
7: if $\exists \phi \in \Gamma$, s.t. $\phi.\text{Pres} \subseteq \text{Clo}_\Gamma(\varphi.\text{Pres})$ then
8:    return true

---

$\text{Clo}_\Gamma(W)=\{t_\alpha.H>t_\beta.H, t_\beta.L>t_\alpha.H, t_\beta.H<t_\alpha.H\}$, because $t_\beta.H<t_\alpha.H$ is implied by $\{t_\alpha.H>t_\beta.H, t_\beta.L>t_\alpha.H\}$ through basic algebraic transitivity (Line 3). Since $c_{16}.\text{Pres} \subset \text{Clo}_\Gamma(W)$, thus the implication holds.

5. DCs Discovery Algorithm

This section describes the instance-driven discovery algorithm, FASTDC. FASTDC starts by analyzing the schema R to build a predicate space P. Given P, a space of candidate DCs is defined, which is of size $2^{|P|}$. Since checking each candidate DC against the input instance is quadratic in the number of tuples, it is unfeasible to validate each candidate DC individually. A method is described below that relies on evidence built from the input instance I for efficient discovery of only valid minimal DCs.

5.1 FASTDC

Algorithm 3 below describes a procedure for discovering minimal DCs. Since a DC is composed of a set of predicates, a predicate space P is built based on schema R (Line 1). Any subset of P could be a set of predicates for a DC.

---

Algorithm 3 FASTDC

---

Input: One relational instance I, schema R
Output: All minimal DCs $\Sigma$
1: $P \leftarrow$ BUILD PREDICATE SPACE (I, R)
2: $\text{Evi}_I \leftarrow$ BUILD EVIDENCE SET(I, P)
3: MC $\leftarrow$ SEARCH MINIMAL COVERS($\text{Evi}_I$, $\text{Evi}_I$, $\emptyset$, $>_{init}$, $\emptyset$)
4: for all $X \in$ MC do
5:    $\Sigma \leftarrow \Sigma + \neg(\overline{X})$
6: for all $\varphi \in \Sigma$ do
7:    if $\Sigma - \varphi \models \varphi$ then
8:       remove $\varphi$ from $\Sigma$

---

It is not feasible to validate each candidate DC directly over I, due to the quadratic complexity of checking all tuple pairs. For this reason, evidence is extracted from I in a way that enables the reduction of DCs discovery to a search problem that computes valid minimal DCs without checking each candidate DC individually.

The evidence that is extracted is composed of sets of satisfied predicates in P, one set for every pair of tuples (Line 2). For example, assume two satisfied predicates for one tuple pair: $t_\alpha.A=t_\beta.A$ and $t_\alpha.B=t_\beta.B$. The set of satisfied predicates is used to derive the valid DCs that do not violate this tuple pair. In the example, if attributes A, B are of type string, there are five DCs that hold on that tuple pair, including $\neg(t_\alpha.A\neq t_\beta.A)$ and $\neg(t_\alpha.A=t_\beta.A \wedge t_\alpha.B\neq t_\beta.B)$. Let $\text{Evi}_I$ be the sets of satisfied predicates for all pairs of tuples, deriving valid minimal DCs for I corresponds to finding the minimal sets of predicates for $\text{Evi}_I$ (Line 3). For each minimal set, which is known as minimal cover (X in Algorithm 3), a valid minimal DC is derived by inverting each predicate in it (Lines 4-5). Finally, (lines 6-8) implied DCs are removed from Σ using Algorithm 2.

Section 5.2 describes the detailed procedure for building the predicate space P. Section 5.3 formally defines $Evi_I$, gives a theorem that reduces the problem of discovering all minimal DCs to the problem of finding all minimal covers for $Evi_I$, and presents a procedure for building $Evi_I$. Section 5.4 describes a search procedure for finding minimal covers for $Evi_I$. In order to reduce the execution time, the search is optimized with a dynamic ordering of predicates and branch pruning based on the axioms we developed in Section 4. In order to enable further pruning, Section 5.5 introduces an optimization technique that divides the space of DCs and performs DFS on each subspace.

5.2 Building the Predicate Space

Given a database schema R and an instance I, a predicate space P is built from which DCs can be formed as described below in Algorithm 4. For each attribute in the schema, two predicates are added which describe equality and inequality between two tuples on that attribute (Lines 1-2). In the same way, for each numerical attribute, order predicates are added (Lines 3-4). Every pair of attributes in R, are joinable if one can define equality predicates (=, ≠) on them, and comparable if one can define order predicates (>, ≤, <, ≥) on them. Cross column predicates are added for joinable column pairs (Lines 6-8). Cross column order predicates are added for comparable column pairs (Lines 10-12).

---
Algorithm 4 BUILDING PREDICATE SPACE
---

Input: One relational instance I, schema R
Output: Predicate space P
1: for all A ∈ R do
2:     P ← $t_α$.Aθ$t_β$.A, where θ ∈ {=, ≠}
3:     if A is numerical type then
4:         P ← P + $t_α$ .Aθβ .A, where θ ∈ {>, ≤, <, ≥}
5: Profiling to find joinable column pairs EQColPairs
6: for all ⟨ARTWORK A, B ARTWORK⟩ ∈ EQColPairs do
7:     P ← P + $t_α$.Aθ$t_α$.B, where θ ∈ {=, ≠}
8:     P ← P + $t_α$.Aθ$t_β$.B, where θ ∈ {=, ≠}
9: Profiling to find comparable column pairs OrderColPairs
10: for all ⟨A, B⟩ ∈ OrderColPairs do
11:    P ← P + $t_α$.Aθ$t_α$.B, where θ ∈ {>, ≤, <, ≥}
12:    P ← P + $t_α$.Aθ$t_β$.B, where θ ∈ {>, ≤, <, ≥}

Example 7

Consider a small Employee Table with three attributes: Employee ID (I), Manager ID (M), and Salary(S).

| I(String) | M(String) | S(Double) |
|---|---|---|
| A1 | A1 | 50 |
| A2 | A1 | 40 |
| A3 | A1 | 40 |

The following predicate space P can be built:

| | | |
|---|---|---|
| $P_1$: $t_α$.I = $t_β$.I | $P_5$: $t_α$.S = $t_β$.S | $P_9$: $t_α$.S < $t_β$.S |
| $P_2$: $t_α$.I ≠ $t_β$.I | $P_6$: $t_α$.S ≠ $t_β$.S | $P_{10}$: $t_α$.S ≥ $t_β$.S |
| $P_3$: $t_α$.M = $t_β$.M | $P_7$: $t_α$.S > $t_β$.S | $P_{11}$: $t_α$.I = $t_α$.M |
| $P_4$: $t_α$.M ≠ $t_β$.M | $P_8$: $t_α$.S ≤ $t_β$.S | $P_{12}$: $t_α$.I ≠ $t_α$.M |
| $P_{13}$: $t_α$.I = $t_β$.M | $P_{14}$: $t_α$.I ≠ $t_β$.M | |

5.3 Evidence Set

This section, defines the formal definition of $Evi_I$. A theorem is described that transforms the problem of minimal DCs discovery into the problem of searching for minimal set covers for $Evi_I$. Finally, a procedure is described for computing $Evi_I$. For example, the evidence set for the table in Example 7 is $Evi_I$={{$P_2$, $P_3$, $P_5$, $P_8$, $P_{10}$, $P_{12}$, $P_{14}$}, {$P_2$, $P_3$, $P_6$, $P_8$, $P_9$, $P_{12}$, $P_{14}$}, {$P_2$, $P_3$, $P_6$, $P_7$, $P_{10}$, $P_{11}$, $P_{13}$}}.

Definition 2.

Evidence Set

Given a pair of tuple ⟨$t_x$,$t_y$⟩∈I, the satisfied predicate set for ⟨$t_x$,$t_y$⟩ is SAT(⟨$t_x$,$t_y$⟩)={P|P∈P,⟨$t_x$,$t_y$⟩ ⊨P}, where P is the predicate space, and ⟨$t_x$,$t_y$⟩ ⊨P means ⟨$t_x$,$t_y$⟩ satisfies P.

The evidence set of I is $Evi_I$={SAT(⟨$t_x$,$t_y$⟩)|∀⟨$t_x$,$t_y$⟩∈I}.

The minimal cover for $Evi_I$ is a set of predicates, that intersect with every SAT(⟨$t_x$,$t_y$⟩) in $Evi_I$.

Definition 3.

A set of predicates X⊆P is a minimal cover for $Evi_I$ if ∀E∈$Evi_I$, x∩E≠∅, and ∄ Y⊂X, s.t. ∀E∈$Evi_I$, Y∩E≠∅.

Theorem 3 transforms the problem of minimal DCs discovery into the problem of searching for minimal set covers for $Evi_I$.

Theorem 3.

¬($\overline{X}_1$∧ . . . ∧$\overline{X}_n$) is a valid minimal DC if and only if X={$X_1$, . . . , $X_n$} is a minimal cover for $Evi_I$.

Proof.

Consider X⊆P, which is a cover of $Evi_I$. According to the definition, $Evi_I$ represents all the pieces of evidence that might violate DCs. For any E∈$Evi_I$, there exists X∈X, X∈E; thus $\overline{X}$⊄E. In other words, the presence of $\overline{X}$ disqualifies E as a possible violation of any DC.

Example 8 shows an application of Theorem 3.

Example 8

Consider $Evi_I$ built for the table in Example 7.

$X_1$={$P_2$} is a minimal cover, thus ¬($P_2$), i.e., ¬($t_α$.I=$t_β$.I) is a valid DC, which states I is a key.

$X_2$={$P_{10}$, $P_{14}$} is another minimal cover, thus ¬($\overline{P}_{10}$∧$\overline{P}_{14}$), i.e., ¬($t_α$.S<$t_β$.S∧$t_α$.I=$t_β$.M) is another valid DC, which states that a manager's salary cannot be less than her employee's.

Algorithm 5 presents the procedure for building $Evi_I$. This operation is sensitive to the size of the database, with a complexity of O(|P|×|r|$^2$). However, the expensive loop (Lines 1-2) is easy to parallelize since each iteration is independent of each other. On a single machine with multi-core CPU, multi-thread computation is used. On a cluster, the task is distributed to all machines. The effect of parallelization will be demonstrated in Section 7.

---
Algorithm 5 BUILD EVIDENCE SET
---

Input: One relational instance I, predicate space P
Output: $Evi_I$
1: for Tuple $t_x$ ∈ I do
2:     for Tuple $t_y$ ∈ I do
3:         if $t_x$ = $t_y$ then
4:             continue
5:         SAT ← ∅
6:         for P ∈ P do
7:             if⟨$t_x$, $t_y$⟩ ⊨ P then
8:                 SAT ← SAT + P
9:         if SAT ∉ $Evi_I$ then
10:            $Evi_I$ ← $Evi_I$ + SAT

5.4 DFS for Minimal Covers

Algorithm 6 below presents the depth-first search (DFS) procedure for minimal covers for $Evi_I$ (Lines 9-10 are described later in Section 5.5). The evidence denoted by $Evi_{curr}$ set is not covered so far. Initially $Evi_{curr}=Evi_I$. Whenever a predicate P is added to the cover, the elements that contain P, i.e., $Evi_{next}=\{E|E\in E_{curr} \wedge P\notin E\}$ are removed from $Evi_{curr}$ (Line 21). There are two base cases to terminate the search:

(i) when the search reaches a point where there are no more candidate predicates to include in the cover, but the current evidence set is still not empty (Lines 12-14); and (ii) when the current evidence set is empty, the current path is a cover. After checking the minimality of the cover (Line 16), it is added to the set of all minimal covers MC (Lines 15-18).

The search procedure is speeded up by two important optimizations: dynamic ordering of predicates when descending down the search tree and branching pruning based on the axioms developed in Section 4.

---

Algorithm 6 Search Minimal Covers

Input: 1. Input Evidence set, $Evi_I$
2. Evidence set not covered so far, $Evi_{curr}$
3. The current path in the search tree, $X \subseteq P$
4. The current partial ordering of the predicates, $>_{curr}$
5. The DCs discovered so far, $\Sigma$
Output: A set of minimal covers for Evi, denoted as MC
1: Branch Pruning
2:  P ← X.last
3:  if $\exists Q \in X - P$, s.t. $P \in Imp(Q)$ then
4:      return //Triviality pruning
5:  if $\exists Y \in MC$, s.t. $X \supseteq Y$ then
6:      return //Subset pruning based on MC
7:  if $\exists Y = \{Y_1, \ldots, Y_n\} \in MC$, and $\exists i \in [1, n]$, and $\exists Q \in Imp(Y_i)$, s.t. $Z = Y_{-i} \cup \overline{Q}$ and $X \supseteq Z$ then
8:      return //Transitive pruning based on MC
9:  if $\exists \varphi \in \Sigma$, s.t. $\overline{X} \supseteq \varphi.Pres$ then
10:     return //Subset pruning based on previous discovered DCs
11: Base cases
12: if $>_{curr} = \emptyset$ and $Evi_{curr} \neq \emptyset$ then
13:     return //No DCs in this branch
14: if $Evi_{curr} = \emptyset$ then
15:     if no subset of size $|X| - 1$ covers $Evi_{curr}$ then
16:         MC ← MC + X
17:     return //Got a cover
18: Recursive cases
19: for all Predicate $P \in >_{curr}$ do
20:     X ← X + P
21:     $Evi_{next}$ ← remaining evidence sets in $Evi_{curr}$ not yet covered by P
22:     $>_{next}$ ← the total ordering of $\{P' | P >_{curr} P'\}$ according to $Evi_{next}$
23:     SEARCH MINIMAL COVERS( $Evi_I$, $Evi_{next}$, X, $>_{next}$, $\Sigma$)
24:     X ← X - P

---

Opt1: Dynamic Ordering.

Instead of fixing the order of predicates when descending down the tree, the remaining candidate predicates, denoted as $>_{curr}$, are ordered based on the number of remaining evidence set they cover. Formally, the cover of P is ordered with respect to Evi as $Cov(P, Evi)=|\{P\in E|E\in Evi\}|$. And $P>Q$ if $Cov(P, Evi)>Cov(Q, Evi)$, or $Cov(P, Evi)=Cov(Q, Evi)$ and P appears before Q in the preassigned order in the predicate space.

Example 9

Consider the initial evidence set for the table in Example 7. The cover for each predicate is computed, such as $Cov(P_2, Evi_I)=3$, $Cov(P_8, Evi_I)=2$, $Cov(P_9, Evi_I)=1$, etc. The initial ordering for all predicates according to $Evi_I$ is $>_{init}=P_2>P_3>P_6>P_8>P_{10}>P_{12}>P_{14}>P_5>P_7>P_9>P_{11}>P_{13}$.

Opt2: Branch Pruning.

The purpose of performing dynamic ordering of candidate predicates is to get covers as early as possible so that those covers can be used to prune unnecessary branches of the search tree. Three pruning strategies are described below.

(i) Lines (2-4) describe the first branch pruning strategy. This branch would eventually result in the DC of the form $\varphi:{}^!(\overline{X-P} \wedge \overline{P} \wedge W)$, with predicate P being the most recent predicate added to this branch and W being other predicates if this branch is traversed. If $P\in Imp(\overline{X-P})$, then $\varphi$ is a trivially satisfied DC according to Axiom Triviality.

(ii) Lines (5-6) describe the second branch pruning strategy, which is based on MC. If Y is in the cover, then ${}^!(\overline{Y})$ is a valid DC. Any branch containing X would result in a DC of the form ${}^!(\overline{X} \wedge W)$, which is implied by ${}^!(\overline{Y})$ based on Axiom Augmentation, since $Y \subseteq X$.

(iii) Lines (7-8) describe the third branching pruning strategy, which is also based on MC. If Y is in the cover, then ${}^!(\overline{Y_{-i}} \wedge \overline{Y_i})$ is a valid DC. Any branch containing $X \supseteq Y_{-i} \cup \overline{Q}$ would result in a DC of the form ${}^!(\overline{Y_{-i}} \wedge \overline{Q} \wedge W)$. Since $Q\in Imp(Y_i)$, by applying Axiom Transitive on these two DCs, it is revealed that ${}^!(\overline{Y_{-i}} \wedge W)$ is also a valid DC, which would imply ${}^!(\overline{Y_{-i}} \wedge \overline{Q} \wedge W)$ based on Axiom Augmentation. Thus this branch can be pruned.

5.5 Dividing the Space of DCs

Instead of searching for all minimal DCs at once, the space of all DCs is divided into subspaces based on whether a DC contains a specific predicate $P_1$, which can be further divided according to whether a DC contains another specific predicate $P_2$.

This section describes how to discover minimal DCs in each subspace. A detailed strategy is described for dividing the DCs space, and the pruning opportunities identified by this operation.

In order to discover DCs that contain a predicate P, an evidence set module predicate P is defined, i.e., $Evi_I^P$ and a theorem is described that reduces searching DCs containing a predicate P into the problem of finding all minimal covers for $Evi_I^P$.

Definition 4.

Given a $P\in \mathbf{P}$, the evidence set of I module P is, $Evi_I^P=\{E-\{P\}|E\in Evi_I, P\in E\}$ Theorem 4.

${}^!(\overline{X_1} \wedge \ldots \wedge \overline{X_n} \wedge P)$ is a valid minimal DC, that contains predicate P, if and only if $X=\{X_1, \ldots, X_n\}^I$ is a minimal cover for $Evi_I^P$.

Proof:

Follow the same line of the proof for Theorem 3. Theorem 4 reduces the problem of discovering all minimal DCs $\Sigma$ to the problem of finding all minimal covers of $Evi_I^P$ for each predicate P in the predicate space P.

Example 10

Consider $Evi_I^I$ $Evi_I^{P1}=\emptyset Evi_I^{P13}=\{\{P_2, P_3, P_6, P_7, P_{10}, P_{11}\}\}$. Thus ${}^!(P_1)$ is a valid DC because there is nothing in the cover for $Evi_I$, and ${}^!(P_{13} \wedge \overline{P_{10}})$ is a valid DC because $\{P_{10}\}$ is a cover for $Evi_I^{P13}$ It is evident that $Evi_I^P$ is much smaller than $Evi_I$.

However, care must be taken before starting to search for minimal covers for $Evi_I^P$ due to the following two problems.

First, a minimal DC containing a certain predicate P is not necessarily a global minimal DC. For instance, assume that ${}^!(P, Q)$ is a minimal DC containing P because $\{\overline{Q}\}$ is a minimal cover for $Evi_I^P$. However, it might not be a minimal DC because it is possible that ${}^!(Q)$, which is actually smaller than ${}^!(P, Q)$, is also a valid DC. ${}^!(P, Q)$ is a local minimal DC with respect to P, and ${}^!(Q)$, a global minimal DC, or a minimal DC. A global minimal DC is always a local minimal DC with respect to each predicate in the DC. The goal is to generate all globally minimal DCs.

Second, assume that $\neg(P, Q)$ is a global minimal DC. It would appear as an output in $\Sigma(P)$, as well in $\Sigma(Q)$. A minimal DC $\varphi$ would then appear in $|\varphi.\text{Pres}|$ searches for minimal set covers, causing a large amount of repeated work.

The second problem is solved first, then, the solution for the first problem comes naturally. The DCs space is divided and all searches are ordered in a way, such to ensure that the output of a locally minimal DC is indeed global minimal, and a previously generated minimal DC will never appear again in latter searches. Consider a predicate space P that has only 4 predicates $R_1$ to $R_4$ as shown in FIG. 6, which presents a taxonomy of all DCs. In the first level, all DCs can be divided into DCs containing $R_1$, denoted as $+R_1$, and DCs not containing $R_1$, denoted as $R_1$. Since it is known how to search for local minimal DCs containing $R_1$, there is only a need to further process DCs not containing $R_1$, which can be divided based on containing $R_2$ or not, i.e., $+R_2$ and $-R_2$. $-R_2$, $-R_3$ are divided as in FIG. 6. Searching for DCs' not containing Ri can be enforced by disallowing Ri in the initial ordering of candidate predicates for minimal cover. Since this is a taxonomy of all DCs, no minimal DCs can be generated multiple times, thus solving the second problem mentioned above.

The first problem is solved by performing depth first searches according to the taxonomy tree in a bottom-up fashion. The method starts by searching for DCs containing $R_4$ and not containing $R_1$, $R_2$, $R_3$. Then the method searches for DCs, containing $R_3$, not containing $R_1$, $R_2$, and the method checks if the resulting DC is global minimal by checking if the reverse of the minimal cover is a super set of DCs already discovered from $\text{Evi}_I^{R_4}$. Then the method searches for DCs, containing $R_2$, not containing $R_1$, and checks if the resulting DC is global minimal by checking if the reverse of the minimal cover is a superset of DCs already discovered from $\text{Evi}_I^{R_3}$, $\text{Evi}_I^{R_4}$. The process goes on until it reaches the root of the taxonomy tree, thus ensuring that the results are both globally minimal and complete. Two additional optimization opportunities coming from dividing the DCs space are discussed below:

1. Reduction of Number of Searches. If $\exists P \in \overline{P}$, such that $\text{Evi}_I^P = \emptyset$, the method identifies two scenarios for Q, where DFS for $\text{Evi}_I^Q$ can be eliminated.
(i) $\forall Q \in \text{Imp}(\overline{P})$. If $\text{Evi}_I^P = \emptyset$, then $\neg(P)$ is a valid DC. The search for $\text{Evi}_I^Q$ would result in a DC of the form $\neg(Q \wedge W)$, where W represents any other set of predicates. Since $Q \in \text{Imp}(\overline{P})$, applying Axiom Transitivity, $\neg(W)$ is a valid DC, which implies $\neg(Q \wedge W)$ based on Axiom Augmentation. (ii) $\forall \overline{Q} \in \text{Imp}(\overline{P})$ Since $Q \in \text{Imp}(\overline{P})$, then $Q \models P$, then $Q \wedge W \models P$. Taking the contrapositive, the result is $\neg(P) \models \neg(Q \wedge W)$.

Example 11

Consider $\text{Evi}_I^{P_4}$ since $\text{Evi}_I^{P_1} = \emptyset$ and $\text{Evi}_I^{P_4} = \emptyset$, then $Q = \{P_1, P_2, P_3, P_4\}$. Thus the method only needs to perform $|P|-|Q|=10$ searches instead of $|P|=14$ searches.

2. Additional Branch Pruning. Since the method performs depth-first searches according to the taxonomy tree in a bottom-up fashion, DCs discovered from previous searches are used to prune branches in current DFS. Lines 9-10 of Algorithm 6 describe the additional branching pruning strategy: if $\varphi$ is a valid DC discovered from previous searches, any branch containing X, such that $\overline{X} \supseteq \varphi.\text{Pres}$, would result in a DC of the form $\neg(\varphi.\text{Pres} \wedge W)$, which is implied by $\varphi$ based on Axiom Augmentation.

Since Algorithm 6 is an exhaustive search for all minimal covers for $\text{Evi}_I$, Algorithm 3 will produce all minimal DCs that form a canonical cover.

Theorem 5.

Algorithm 3 produces a canonical cover of all non-trivial minimal DCs holding on input database I.

Complexity Analysis of FASTDC. The initialization of evidence sets takes $O(|P|*n^2)$. The time for each DFS search to find all covers for $\text{Evi}_I^P$, is $O((1+w_P)*K_P)$ with $w_P$ being the extra effort due to imperfect search of $\text{Evi}_I^P$ and $K_P$ being the number of minimal DCs containing predicate P. Altogether, the FASTDC algorithm has a worst time complexity of $O(|P|*n_2+|P|*(1+w_P)*K_P)$.

5.6 Approximate FASTDC: A-FASTDC

Algorithm FASTDC consumes the whole input data set and requires no violations for a discovered DC to be declared valid. In real scenarios, there are multiple reasons why this request may need to be relaxed:

(1) overfitting: data is dynamic and as more data becomes available, overfitting constraints on current data set can be problematic;

(2) data errors: while in general learning from unclean data is a challenge, the common belief that errors constitute small percentage of data, discovering constraints that hold for most of the dataset is a common workaround.

To handle this requirement, we modify the discovery statement as follows: given a relational schema R and instance I, the approximate DCs discovery problem for DCs is to find a minimal cover $\Sigma$ of valid DCs, where a DC $\varphi$ is valid if the percentage of violations of $\varphi$ on I, i.e., number of violations of $\varphi$ on I divided by total number of tuple pairs $|I|(|I|-1)$, is within threshold $\varepsilon$. In this section, we describe, A-FASTDC, a variant of FASTDC for approximate DCs discovery.

Different tuple pairs might have the same satisfied predicate set. For every element E in $\text{Evi}_I$, we denote by count(E) the number of tuple pairs $\langle t_x, t_y \rangle$ such that $E=\text{SAT}(\langle t_x, t_y \rangle)$. For example, count($\{P_2; P_3; P_6; P_8; P_9; P_{12}; P_{14}\}$)=2 for the table in Example 7 since $\text{SAT}(\langle t_{10}, t_9 \rangle) = \text{SAT}(\langle t_{11}, t_9 \rangle) = \{P_2; P_3; P_6; P_8; P_9; P_{12}; P_{14}\}$.

Definition 5.

A set of predicates $X \subseteq P$ is an $\varepsilon$-minimal cover for $\text{Evi}_I$ if Sum(count(E))$\leq \varepsilon |I|(|I|-1)$, where $E \in \text{Evi}_I$, $X \cap E = \emptyset$, and no subset of X has such property.

Theorem 6 transforms approximate DCs discovery problem into the problem of searching for $\varepsilon$-minimal covers for $\text{Evi}_I$.

Theorem 6.

$\neg(\overline{X_1} \wedge \ldots \wedge \overline{X_n})$ is a valid approximate minimal DC if and only if $X=\{X_1, \ldots, X_n\}$ is an $\varepsilon$-minimal cover for $\text{Evi}_I$.

There are two modifications for Algorithm 6 to search for $\varepsilon$-minimal covers for $\text{Evi}_I$: 1) the dynamic ordering of predicates is based on $C_{ov}(P,\text{Evi})=\Sigma_{E \in \{E \in \text{Evi}, P \in E\}}\text{count}(E)$; and 2) the base cases (Lines 12-17) are either when the number of violations of the corresponding DC drops below $\varepsilon|I|(|I|-1)$, or the number of violations is still above $\varepsilon|I|(|I|-1)$ but there are no more candidate predicates to include. The detailed modifications for Algorithm 6 to search for $\varepsilon$-minimal covers for $\text{Evi}_I$ are shown in Algorithm 7 which is shown in FIG. 7.

6. Ranking DCS

Though our FASTDC is able to prune trivial, non-minimal, and implied DCs, the number of DCs returned can still be too large. To tackle this problem, we propose a scoring function to rank the returned DCs based on their size and their support from the data. Given a DC $\varphi$, its interestingness score is denoted by the Inter function as Inter ($\varphi$). The Inter score [Inter (φ)] is similar to a schema-conformance score. A DC is schema-conforming if it is verified on every valid instances of R.

We recognize two different dimensions that influence Inter(φ): succinctness and coverage of φ, which are both defined on a scale between 0 and 1. Each of the two scores represents a different yet important intuitive dimension that should be taken into account when ranking discovered DCs.

Succinctness is motivated by the Occam's razor principle. This principle suggests that among competing hypotheses, the one that makes fewer assumptions is preferred. It is also recognized that overfitting occurs when a model is excessively complex.

Coverage is a general principle in data mining to rank results and avoid overfitting. Scoring functions measure the statistical significance of the mining targets in the input data. The more evidence in the input data that supports a DC, the more likely this DC applies on unseen data.

Given a DC φ, the interestingness score is a linear weighted combination of the two dimensions:

$$\text{Inter}(\varphi) = a_1 \times \text{Succ}(\varphi) + a_2 \times \text{Coverage}(\varphi), a_1 + a_2 = 1$$

Experiments in Section 7 show that by combining both dimensions (succinctness and coverage of φ) the best results are achieved in terms of ranking discovered DCs. Succinctness and coverage are described in more detail below.

6.1 Succinctness

Minimum description length (MDL), which measures the code length needed to compress the data, is a formalism to realize the Occam's razor principle. Inspired by MDL, the length of a DC Len(φ) is measured, and the succinctness of a DC φ, i.e., Succ(φ), is defined as the minimal possible length of a DC divided by Len(φ) thus ensuring the scale of Succ(φ) is between 0 and 1.

$$Succ(\varphi) = \frac{\text{Min}(\{\text{Len}(\phi) \mid \forall \phi\})}{\text{Len}(\varphi)}$$

One simple heuristic for Len(φ) is to use the number of predicates in φ, i.e., |φ.Pres|. The function computes the length of a DC with a finer granularity than a simple counting of the predicates. To compute it, we identify the alphabet from which DCs are formed as A={$t_\alpha$, $t_\beta$, U, B}, where U is the set of all attributes, and B is the set of all operators. The length of a DC φ is defined as the number of symbols in A that appear in φ: Len(φ)=|{a|a∈A, a∈φ}|. The minimal DC possible is of length 4, such as $c_5$ and $c_{17}$.

Example 12

Consider a database schema R with two columns A, B, with 3 DCs as follows:

$\neg(t_\alpha.A = t_\beta.A)$   $c_{14}$:

$\neg(t_\alpha.A = t_\beta.B)$   $c_{15}$:

$\neg(t_\alpha.A = t_\beta.A \land t_\alpha.B \neq t_\beta.B)$   $c_{16}$:

Len($c_{14}$)=4<Len($c_{15}$)=5<Len($c_{16}$)=6.
Succ($c_{14}$)=1, Succ$_{15}$=0.8, and Succ$_{16}$=0.67.
However, if |φ.Pres| is used as Len(φ), Len($c_{14}$)=1<Len ($c_{15}$)= 1<Len($c_{16}$)=2, and Succ($c_{14}$)=1, Succ($c_{15}$)=1, and Succ($c_{16}$)=0.5.

6.2 Coverage

Frequent itemset mining recognizes the importance of measuring statistical significance of the mining targets. In this case, the support of an itemset is defined as the proportion of transactions in the data that contain the itemset. Only if the support of an itemset is above a threshold, it is considered to be frequent. CFDs discovery also adopts such principle. A CFD is considered to be interesting only if their support in the data is above a certain threshold, where support is in general defined as the percentage of single tuples that match the constants in the pattern tableaux of the CFDs.

However, the above statistical significance measure requires the presence of constants in the mining targets. For example, the frequent itemsets are a set of items, which are constants. In CFDs discovery, a tuple is considered to support a CFD if that tuple matches the constants in the CFD. Our target VDCs lack constants, and so do FDs. Therefore, a different measure is needed for statistical significance of discovered DCs on I.

Example 13

Consider $c_2$, which is a FD, in Example 1. Looking at single tuple, just as the statistical measure for CFDs, every tuple matches $c_2$ since it does not have constants. However, the tuple pair ⟨$t_4,t_7$⟩ gives more support than the tuple pair ⟨$t_2,t_6$⟩ because ⟨$t_4,t_7$⟩ matches the left hand side of $c_2$.

Being a more general form than FDs, DCs have further evidence that can be exploited to give an accurate measure of the statistical significance of a DC on I.

An evidence of a DC φ is a pair of tuples that does not violate φ; there exists a predicate in φ that is not satisfied by the tuple pair. However, depending on the number of satisfied predicates, different evidences give different support to the statistical significance score of a DC. The larger the number of satisfied predicates is in a piece of evidence, the more support it should give to the schema-conformance score of φ. kE is defined as follows: where k is the number of satisfied predicates is k, and weight w(k) is given to kE, which is from 0 to 1, and increases with k.

Definition 5.

Evidences and Weights:

A kE of a DC φ with respect to a relational instance r is a tuple pair ⟨$t_x,t_y$⟩, and the number of predicates satisfied by ⟨$t_x,t_y$⟩ is k, where k≤|φ.Pres|−1.

The weight for kE of a DC φ is $$w(k) \doteq \frac{(k+1)}{|\varphi \cdot Pres|}$$

Example 14

Consider $c_8$ in Example 3, which has 2 predicates. There are two types of evidences, i.e., 0E and 1E.
⟨$t_1,t_2$⟩ is a 0E since $t_1$.FN≠$t_2$.FN and $t_1$.GD=$t_2$.GD.
⟨$t_1,t_3$⟩ is a 1E since $t_1$.FN≠$t_3$.FN and $t_1$.GD≠$t_3$.GD.
⟨$t_1,t_6$⟩ is a 1E since $t_1$.FN=$t_6$.FN and $t_1$.GD=$t_6$.GD.
Clearly, ⟨$t_1,t_3$⟩ and ⟨$t_1,t_6$⟩ give more support about the schema-conformance score of $c_8$ than ⟨$t_1,t_2$⟩.

Given such evidence, the coverage of a DC φ, Coverage (φ) is defined as follows:

$$\text{Coverage}(\varphi) = \frac{\sum_{k=0}^{|\varphi \cdot Pres|-1} |kE| * w(k)}{|I| \times (|I|-1)}$$

The enumerator of Coverage($\varphi$) counts the number of different evidences weighted by their respective weights, which is divided by the total number of evidences. Coverage ($\varphi$) gives a score between 0 and 1, with higher score indicating higher statistical significance.

Example 15

Given 8 tuples in Table 1, there are 8*7=56 evidences. Coverage ($c_8$)=0.80357, Coverage($c_2$)=0.9821. It can be seen that coverage score is more confident about $c_2$, thus reflecting our intuitive comparison between $c_2$ and $c_8$ in Section 1.

7.1 Datasets

Synthetic:

A Tax data generator is used in which each record represents an individual's address and tax information. The schema consists of 13 attributes: FName, LName, Area-Code, Mobile Phone, City, State, Zip, MaritalStatus, HasChild, Salary, TaxRate, SingleTaxExemp, ChildTaxExemp. The first nine attributes are of type string, the last four attributes are of numerical types (Integer or Double). The FName, LName are populated using a name database. The address information is populated using real semantic relationship. Furthermore, salary is synthetic, while tax rates and tax exemptions (based on salary, state, marital status and number of children) correspond to real life scenarios.

Real-World:

Two datasets are used from different Web sources:

1) Hospital data from the US federal government website. There are 17 attributes, including Provider number (PN), State average (SAVG), measure code (MC), measure name (MN), phone number (PHO), etc. All of 17 attributes are string values.

2) SP Stock data extracted from historical S&P 500 Stocks. Each record is arranged into fields representing the Date, Ticker, Price of Open, High, Low, Close of the day, and Volume of the day.

7.2 Scalability Evaluation

The Tax dataset is used to evaluate the running time of FASTDC by varying the number of tuples |I|, and the number of predicates |P|. As the building evidence set operation is expensive with large instances, it is shown that parallelizing this operation on a cluster leads to improvement depending on the number of machines in the cluster.

Algorithms: FASTDC was implemented in Java, and various optimization techniques were tested. FASTDC+M is used to represent running FASTDC on a cluster consisting of M machines. FASTDC-DS denotes running FASTDC without dividing the space of DCs as in Section 5.5. FASTDC-DO denotes running FASTDC without dynamic ordering of predicates in the search tree as in Section 5.4.

Exp-1: Scalability in |I|.

Figure 8:
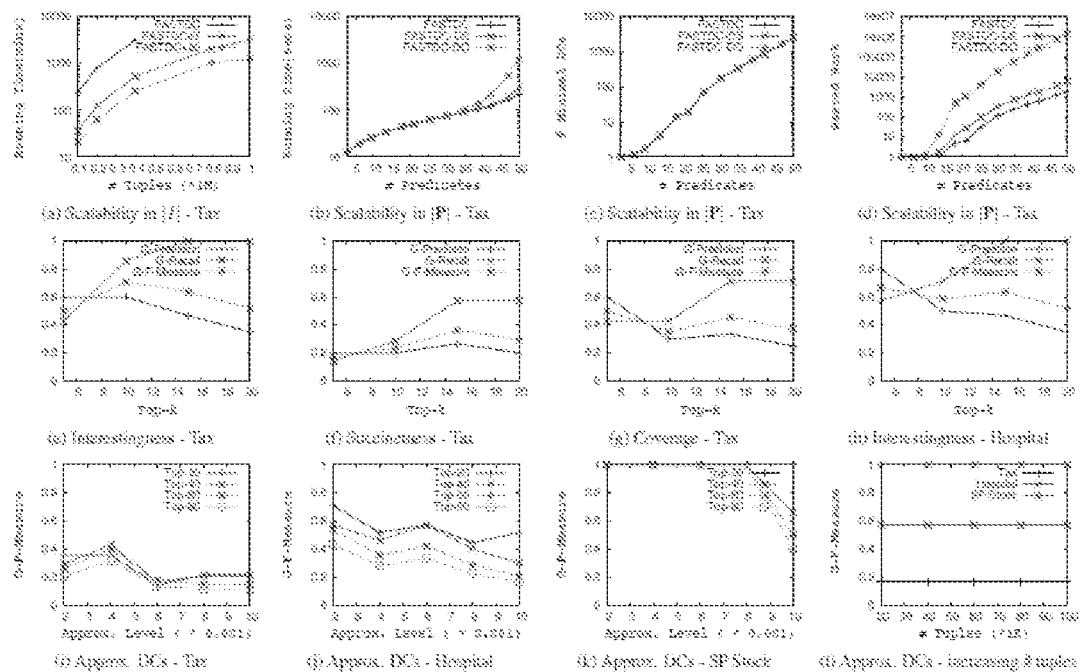
FIGS. 8a-l depict graphical representations of the results of a scalability evaluation with respective example datasets for a FASTDC embodiment according to one or more embodiments shown and described herein.

The running time on all 13 attributes is measured, by varying the number of tuples (up to a million tuples), as illustrated in FIG. 8a. The size of the predicate space |P| is 50. The Y axis of FIG. 8a is in log scale. We compare the running time of FASTDC and FASTDC+M. FIG. 8a shows a quadratic trend as the computation is dominated by the tuple pair-wise comparison for building the evidence set. In addition, FIG. 8a shows that we achieve almost linear improvement with respect to the number of machines on a cluster; for example, for 1M tuples, it took 3257 minutes on 7 machines, but 1228 minutes on 20 machines. Running FASTDC on a cluster is a viable approach if the number of tuples is too large to run on a single machine. There are two reasons for this improvement. First, the number of depth first searches is reduced. Second, inside each search, DCs discovered from previous searches are used to perform branch pruning.

Exp-2: Scalability in |P|.

The running time is measured in seconds using 10 k tuples, by varying the number of predicates picked from the attributes in Tax data, as in FIG. 8b. We compare the running time of FASTDC, FASTDC-DS, and FASTDCDO. The ordering of adding more attributes is randomly chosen and we report the average running time over 20 executions. The Y axes of FIGS. 8b, 8c and 8d are in log scale. FIG. 8b shows that the running time increases exponentially with respect to the number of predicates, especially when it involves numerical values. This is not surprising because the number of minimal DCs, as well as the amount of wasted work, increases exponentially with respect to the number of predicates, as shown in FIGS. 8c and 8d. By dividing DCs space, FASTDC can substantially reduce the amount of wasted work in DFS: for 50 predicates, the algorithm took 3500 seconds without the optimization.

The amount of wasted work is measured by the number of times Line 13 of Algorithm 6 is hit. The number of minimal DCs discovered is the same for FASTDC, FASTDC-DS, and FASTDC-DO as optimizations do not alter the discovered DCs. FASTDC is always more efficient than FASTDC-DS and FASTDC-DO.

For the Hospital dataset, the number of predicates is 34; and it took 118 minutes to run on a single machine using all tuples. For the SP Stock dataset, the number of predicates is 82; and it took 593 minutes to run on a single machine using all tuples.

Parallelization. The parallelization of the tuple pair-wise comparison of Algorithm 5 can lead to better execution times. The running time of FASTDC is compared on a single machine versus the running time on a cluster consisting of 4 machines. Distributing a tuple pair-wise comparison is a viable solution if a dataset is too large to run on a single machine. Smaller size (10 k-50 k), parallel execution does not achieve a "four times" improvement since the searching time for minimal covers takes up a large overhead. For larger datasets with sizes up to 90 k, a parallel version can achieve almost four times improvement because the dominant factor is the tuple pair-wise comparison.

Exp-3: Implication Reduction.

The number of DCs returned by FASTDC can be very large, and many of them are implied by others.

TABLE 4

| Dataset | #DCs Before | #DCs After | % Reduction |
| --- | --- | --- | --- |
| Tax | 1964 | 741 | 61% |
| Hospital | 157 | 42 | 73% |
| SP Stock | 829 | 621 | 25% |

Table 4 shows the number of DCs before and after performing reduction through implication testing for all datasets. It can be seen that the implication testing algorithm, is able to prune a large amount of implied DCs.

7.3 Qualitative Analysis

Given an input instance I of a fixed schema R, it is desirable to discover schema-conforming DCs. First DCs discovered for different datasets are described. A scoring function is then described which is able to improve the precision and recall of returned DCs without user involvement. The scoring function (the Inter function) identifies interesting DCs. FASTDC can be run with 10 k tuples for each dataset using all available attributes.

Discovered DCs.

Table 5 shown in FIG. 9 shows sample DCs discovered in different datasets, with their semantics explained in English. It can be seen that FASTDC is able to discover meaningful DCs that are otherwise difficult to spot or design.

Scoring Function—the Inter Function.

The number of computed DCs, even after implication reduction, is still too large for an exhaustive manual validation. Moreover, human evaluation may be impossible if domain experts are not available. To alleviate these problems, the Inter function can be used in two applications: to limit the manual verification to the k DCs with higher scores, or to prune the DCs whose score is lower than a threshold th.

Several metrics are introduced for qualitative assessments of the discovered DCs used in this section. We evaluate the two dimensions of the Inter function in Exp-4 and Exp-5 according to two different metrics. We report several discovered DCs by FASTDC that are non-trivial for users to design in Exp-6. We evaluate AFASTDC for noisy data in Exp-7. All experiments in this section are done on 100 k tuples for all datasets.

Parameters k and th. depend on the actual domain and can be fixed by the users. Users only need to verify Top-k DCs that are expected to be schema-conforming DCs with high precision, or they can set a threshold if domain experts for DCs verification are unavailable.

Metrics. We denote by $\Sigma_g$ the gold standard DCs that are designed by domain experts and are valid on the datasets. Specifically, $\Sigma_g$ for the Tax dataset is designed by the present applicant; $\Sigma_g$ for the Hospital dataset is retrieved from X. Chu, I. F. Ilyas, and P. Papotti. "*Holistic data cleaning: Putting violations into context*". In *ICDE*, 2013; and $\Sigma_g$ for the SP Stock dataset have been designed by experts. Note that any DCs implied by $\Sigma_g$ should also be considered as gold standard. The discovered DCs are denoted by $\Sigma_s$, i.e. the DCs returned by FASTDC.

We define G-Precision, G-Recall, and G-F-Measure of $\Sigma_s$ as the following:

$$G\text{-Precision}(\Sigma_s) = \frac{|\{\varphi|\varphi \in \Sigma_s, \Sigma_g| = \varphi\}|}{|\Sigma_s|}$$

$$G\text{-Recall}(\Sigma_s) = \frac{|\{\varphi|\varphi \in \Sigma_s, \Sigma_g| = \varphi\}|}{|\Sigma_g|}$$

$$G\text{-}F\text{-Measure}(\Sigma_s) = \frac{2 * g\text{-Precision}(\Sigma_s) * g\text{-Recall}(\Sigma_s)}{g\text{-Precision}(\Sigma_s) + g\text{-Recall}(\Sigma_s)}$$

Ranking-based $\Sigma_s$. FIGS. 8e-h show G-Precision, G-Recall and G-F-Measure with respect to $\Sigma_g$ for Tax and SP Stock data, with $\Sigma_s$ being the Top-k DCs according to the Inter function. There are several possible observations from FIGS. 8e-h. First, precision is high for small values of k. Second, recall is close to one for small values of k and it increases with k, but with a descending degree. Therefore, most of the meaningful DCs is concentrated in Top-k according to the Inter function (scoring function) being the Top-k DCs according to succinctness, coverage and interestingness—hence the term "Inter" function.

By only returning Top-k DCs, many meaningful DCs are not missed. Third, results for the succinctness and coverage functions in isolation show that only by combining their scores best results are achieved in estimating the schema-conformance of DCs.

Notice that in FIG. 8e, the precision is less than 1 with k values smaller than 15 in the Tax dataset. However, this does not necessary imply that the DCs in $\Sigma_s$ that are not implied by $\Sigma_g$ are not schema-conforming. In fact, it turns out that they are also schema-conforming, but are not in $\Sigma_g$ (because the expert was not aware of them) nor are implied by $\Sigma_g$. DCs in $\Sigma_s$ confirmed by domain experts to be schema-conforming are denoted by $\Sigma_u$. For instance, the third entry in Table 5 shown in FIG. 9 is ranked fourth in $\Sigma_s$, which is not in $\Sigma_g$ nor implied by $\Sigma_g$, but is schema-conforming.

The discovery output is measured with the U-Precision, which captures exactly if the DCs are schema-conforming. The U-Precision is defined as the percentage of DCs in $\Sigma_s$ that are verified to be schema-conforming by domain experts. Domain experts might not be exhaustive in designing all gold DCs. DCs that are in $\Sigma_s$ and are not implied by $\Sigma_g$ might also be gold. We denote by $\Sigma_u$ the DCs in $\Sigma_s$ that are verified by domain experts to be gold. We define U-Precision as following:

$$U\text{-Precision}(\Sigma_S) = \frac{|\Sigma_u|}{|\Sigma_s|}$$

Exp-4: Evaluation of Inter Score.

We report in FIGS. 8e-h G-Precision, G-Recall, and G-F-Measure for the Tax and the Hospital datasets, with $\Sigma_s$ being the Top-k DCs according to succinctness, coverage and interestingness. Consider the Tax dataset, results using Inter function as in FIG. 8e are always better than those using succinctness alone as in FIG. 8f and those using coverage alone as in FIG. 8g. Moreover, FIG. 8e shows that Inter score with Top-20 DCs achieves perfect recall; while this is not the case for succinctness and coverage. This is due to two reasons. First, succinctness score blindly promotes shorter DCs that are not true in general, such as $c_7$ in Example 3. Second, coverage score might promote longer DCs that have higher coverage than shorter ones that have less coverage, however, those shorter DCs might be in $\Sigma_g$; for example, the first entry in Table 6 has higher coverage than $¬(t_\alpha.AC=t_\beta.AC \land t_\alpha.PH=t_\beta.PH)$, which is actually in $\Sigma_g$. For the Hospital dataset, interestingness and coverage give the same results as in FIG. 8h, which are considerably better than succinctness because gold DCs for the Hospital dataset are all FDs with two predicates, therefore succinctness has no effect on the interestingness. For the SP Stock dataset, all three scoring functions give the same results because gold DCs for this dataset are simpler DCs, such as $¬(t_\alpha.Low>t_\alpha.High)$.

This experiment shows that both succinctness and coverage are useful in identifying interesting DCs. Combining both dimensions into Inter score achieves the best result in all cases.

TABLE 6

| Dataset | k = 5 | k = 10 | k = 15 | k = 20 |
|---------|-------|--------|--------|--------|
| Tax | 1.0 | 1.0 | 0.93 | 0.75 |
| Hospital | 1.0 | 1.0 | 0.93 | 0.7 |
| SP Stock | 1.0 | 1.0 | 1.0 | 1.0 |

Exp-5: U-Precision:

Table 6 shows the U-Precision for all datasets using the Top-k DCs as $\Sigma_s$. For k=5 and k=10, they have U-Precision of 1.0. While in FIG. 8e, Top-5 and Top-15 G-precision values are less than 1.0. This is due to the fact that FASTDC is able to discover DCs that are gold standard but not easily designed by humans such as the second and third entry in Table 7.

TABLE 7

Sample DCs discovered in the datasets

| Dataset | DC Discovered | Semantics |
|---|---|---|
| Tax | ¬($t_\alpha$.ST = $t_\beta$.ST ∧ $t_\alpha$.SAL < $t_\beta$.SAL ∧ $t_\alpha$.TR > $t_\beta$.TR) | There cannot exist two persons who live in the same state, but one person earns less salary and has higher tax rate at the same time. |
| Tax | ¬($t_\alpha$.CH ≠ $t_\beta$.CH ∧ $t_\alpha$.STX < $t_\alpha$.CTX ∧ $t_\beta$.STX < $t_\beta$.CTX) | There cannot exist two persons with both having CTX higher than STX, but different CH. If a person has CTX, she must have children. |
| Tax | ¬($t_\alpha$.MS ≠ $t_\beta$.MS ∧ $t_\alpha$.STX = $t_\beta$.STX ∧ $t_\alpha$.STX > $t_\alpha$.CTX) | There cannot exist two persons with same STX, one person has higher STX than CTX and they have different MS. If a person has STX, she must be single. |
| Hospital | ¬($t_\alpha$.MC = $t_\beta$.MC ∧ $t_\alpha$.MN ≠ $t_\beta$.MN) | Measure code determines Measure name. |
| Hospital | ¬($t_\alpha$.PN = $t_\beta$.PN ∧ $t_\alpha$.PHO ≠ $t_\beta$.PHO) | Provider number determines Phone number. |
| SP Stock | ¬($t_\alpha$.Open > $t_\alpha$.High) | The open price of any stock should not be greater than its high of the day. |
| SP Stock | ¬($t_\alpha$.Date = $t_\beta$.Date ∧ $t_\alpha$.Ticker = $t_\beta$.Ticker) | Ticker and Date is a composite key. |

Exp-6: Discovered DCs:

Table 7 reports some DCs discovered in different datasets, with their semantics explained in English. It can be seen that FASTDC is able to discover meaningful DCs that are otherwise difficult to spot or design.

Exp-7: A-FASTDC—Discovering Approximate Constraints in the Presence of Dirty Data:

We randomly inject 0.1% noise into the datasets and run A-FASTDC to verify that it discovers meaningful DCs in the presence of noise. Intuitively, A-FASTDC will not only discover gold DCs, but also DCs whose violation percentages happen to be within ε. For example, ¬($t_\alpha$.FN=$t_\beta$.FN ∧ $t_\alpha$.LN=$t_\beta$.LN) is discovered for the Tax data. FIGS. 8i-l plot the G-F-Measure for the Tax, the Hospital, and the SP Stock datasets. Given different approximation levels ε, A-FASTDC is able to achieve reasonable F-Measure for all three datasets. However the results for the Hospital and the SP Stock datasets are better than the Tax datasets because the Tax dataset is richer in semantics. FIG. 8l shows the results for Top-40 DCs given a fixed ε=0.6% while varying the number of tuples. It can be seen that ε is independent of the database size.

Threshold-based $\Sigma_s$: For real life datasets, an approach is to only return DCs whose U-Precision values are above a certain threshold. Table 8 reports the U-Precision values for all the DCs in $\Sigma_s$ where their U-Precision value is above the threshold th.

TABLE 8

| Dataset | th = 0.85 | th = 0.75 | th = 0.65 |
|---|---|---|---|
| Tax | 1(1.0) | 3(1.0) | 12(0.92) |
| Hospital | 0(N/A) | 13(1.0) | 28(0.74) |
| SP Stock | 21(1.0) | 23(1.0) | 138(0.20) |

For each entry is reported the number of DCs in the sample and the precision value in parentheses. The scores give an accurate measure for the schema-conformance of the returned DCs.

Denial Constraints are a useful language formalism that can be used to detect violations, conduct sanity checks through data, clean data and enforce the correct data semantics. Denial Constraints are a useful language formalism to detect violations and enforce the correct application semantics. We have presented static analysis for DCs, including three sound axioms, and a linear implication testing algorithm. We also developed a DCs discovery algorithm (FASTDC), that can also discover approximate constraints in presence of dirty data. In addition, our interestingness score is very effective in identifying meaningful DCs. Our experiments demonstrated the effectiveness of our techniques in discovering interesting DCs. We have several directions to pursue in the future. We are developing algorithms for discovering DCs with constants and we want to investigate sampling techniques to alleviate the quadratic complexity of computing the evidence set.

When used in this specification and claims, the terms "comprises" and "comprising" and variations thereof mean that the specified features, steps or integers are included in an open ended manner. The terms are not to be interpreted to exclude the presence of other features, steps or components.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A computer implemented method of identifying denial constraints and correcting a database instance I, the denial constraints being for use with a database schema R, the method comprising:
   generating candidate predicates using attributes of the database schema R;
   generating a predicate space P using the candidate predicates;
   determining a set of satisfied predicates using at least two tuples of the database instance, wherein the set of satisfied predicates are an evidence set;
   determining a minimal cover set for the satisfied predicates of the evidence set;
   deriving a set of valid denial constraints using the minimal cover set and inverse satisfied predicates for the minimal cover set;
   correcting the database instance using the derived set of valid denial constraints; and
   providing a scoring function to provide a ranking of discovered denial constraints, wherein the scoring function comprises assigning an interestingness score Inter(φ) to each denial constraint φ, the score Inter(φ) being a weighted combination of succinctness and coverage of each denial constraint φ, wherein the discovered denial constraints having the interestingness scores below a threshold value are pruned.

2. The method according to claim 1, wherein generating the predicate space P comprises:
for each attribute in the schema R, adding equality predicates describing equality and inequality between two tuples of the database instance I on an attribute and adding cross column predicates for joinable column pairs,
for each numerical attribute in the schema R, adding order predicates describing greater than, greater than or equal to, less than or equal to, or less than between two tuples on an attribute, and adding cross column order predicates for comparable column pairs
wherein the joinable columns are columns comprising pairs of attributes of R which are equality predicates; and
wherein the comparable columns are columns comprising pairs of attributes of R which are order predicates ($>$, $\leq$, $<$, $\geq$).

3. The method according to claim 1, wherein generating the predicate space P comprises:
for each attribute in the schema R, adding equality predicates describing equality and inequality between two tuples of the database instance I on an attribute and adding cross column predicates for joinable column pairs,
for each numerical attribute in the schema R, adding order predicates describing greater than, greater than or equal to, less than or equal to, or less than between two tuples on an attribute, and adding cross column order predicates for comparable column pairs
wherein the joinable columns are columns comprising pairs of attributes of R which are equality predicates;
wherein the comparable columns are columns comprising pairs of attributes of R which are order predicates ($>$, $\leq$, $<$, $\geq$) and
wherein the predicate space P is generated using the algorithm:

---
Input: One relational instance I, schema R
Output: Predicate space P
1: for all A ∈ R do
2:     P ← $t_\alpha.A\theta t_\beta.A$, where θ ∈ {=, ≠}
3:     if A is numerical type then
4:         P ← P + $t\alpha .A\theta t\beta .A$, where θ ∈ {>, ≤, <, ≥}
5: Profiling to find joinable column pairs EQColPairs
6: for all (A, B) ∈ EQColPairs do
7:     P ← P + $t_\alpha.A\theta_\alpha.B$, where θ ∈ {=, ≠}
8:     P ← P + $t_\alpha.A\theta t_\beta.B$, where θ ∈ {=, ≠}
9: Profiling to find comparable column pairs OrderColPairs
10: for all (A, B) ∈ OrderColPairs do
11:     P ← P + $t_\alpha.A\theta t_\alpha.B$, where θ ∈ {>, ≤, <, ≥}
12:     P ← P + $t_\alpha.A\theta t_\beta.B$, where θ ∈ {>, ≤, <, ≥}.

---

4. The method according to claim 1, wherein the evidence set $Evi_I$, wherein $Evi_I$ is the evidence set, is generated using the algorithm:

---
Input: One relational instance I, predicate space P
Output: $Evi_I$
1: for Tuple $t_x$ ∈ I do
2:     for Tuple $t_y$ ∈ I do
3:         if $t_x = t_y$ then
4:             continue
5:         SAT ← ∅
6:         for P ∈ P do
7:             if ($t_x$, $t_y$) |= P then
8:                 SAT ← SAT + P
9:         if SAT ∈ $Evi_I$ then
10:           $Evi_I$ ← $Evi_I$ + SAT.

---

5. The method according to claim 1, wherein the method further comprises dividing the space of the valid denial constraints into a plurality of subspaces that each comprise a first predicate $P_1$.

6. The method according to claim 1, wherein the method further comprises dividing the space of the valid denial constraints into a plurality of subspaces that each comprise a first predicate $P_1$; and dividing the plurality of subspaces into a plurality of further subspaces that each comprise a second predicate $P_2$.

7. The method according to claim 1, wherein the method further comprises ordering the valid denial constraints in a taxonomy tree according to the predicates in each denial constraint.

8. The method according to claim 1, wherein the method further comprises ordering the valid denial constraints in a taxonomy tree according to the predicates in each denial constraint; and searching for denial constraints by searching the taxonomy tree from the bottom-up.

9. The method according to claim 1, wherein the method further comprises ordering the valid denial constraints in a taxonomy tree according to the predicates in each denial constraint;
searching for denial constraints by searching the taxonomy tree from the bottom-up; and
pruning branches from the taxonomy tree which comprise valid denial constraints identified by the search and performing a further search of the taxonomy tree from the bottom-up.

10. The method according to claim 1, wherein a U-Precision metric is provided which identifies whether a denial constraint is schema-conforming:

$$U\text{-Precision}(\Sigma_S) = \frac{|\Sigma_u|}{|\Sigma_s|},$$

where the discovered denial constraints are denoted by $\Sigma_s$ and $\Sigma_u$ is the denial constraints in $\Sigma_s$ that are verified as gold standard.

11. A method according to claim 1, wherein the succinctness is defined as:

$$Succ(\varphi) = \frac{\text{Min}(\{\text{Len}(\varphi) \mid \forall \phi\})}{\text{Len}(\varphi)}.$$

12. The method according to claim 1, wherein the coverage is defined as:

$$\text{Coverage}(\varphi) = \frac{\sum_{k=0}^{|\varphi\cdot Pres|-1} |kE| * w(k)}{|I| \times (|I| - 1)}.$$

13. The method according to claim 1, wherein, approximate denial constraints are identified by: given a relational schema R and instance I, finding a minimal cover Σ of valid denial constraints, where a denial constraint φ is valid if the percentage of violations of φ on I is within a threshold ε.

14. A system operable to identify denial constraints and correct a database instance I, the denial constraints being for use with a database schema R, the system comprising:
- a hardware processor:
- an algorithm executed by the processor and operable to generate candidate predicates using attributes of the database schema R and a predicate space P for an instance I in the schema R using the generated candidate predicates;
- an algorithm executed by the processor and operable to determine a set of satisfied predicates using at least two tuples of the database instance I, wherein the satisfied predicates are an evidence set;
- an algorithm executed by the processor and operable to identify a minimal set of predicates for the evidence set, and to identify valid denial constraints from the minimal set by inverting the predicates in the minimal set;
- an algorithm executed by the processor to correct the database instance I using the identified denial constraints; and
- an algorithm executed by the processor to provide a scoring function to provide a ranking of discovered denial constraints, wherein the scoring function comprises assigning an interestingness score Inter(φ) to each denial constraint φ, the score Inter(φ) being a weighted combination of succinctness and coverage of each denial constraint φ, and wherein the discovered denial constraints having the interestingness scores below a threshold value are pruned, wherein the succinctness is defined as:

$$Succ(\varphi) = \frac{\text{Min}(\{\text{Len}(\phi) \mid \forall \; \phi\})}{\text{Len}(\varphi)},$$

wherein the coverage is defined as:

$$\text{Coverage}(\varphi) = \frac{\sum_{k=0}^{|\varphi \cdot Pres|-1} |kE| * w(k)}{|I| \times (|I|-1)}.$$

* * * * *